United States Patent
Ohtani et al.

(10) Patent No.: US 6,456,667 B2
(45) Date of Patent: Sep. 24, 2002

(54) METHOD OF CODING SIGNAL FOR DIGITAL OPTICAL COMMUNICATION HAVING SPECTRUM WHICH ATTAINS ZERO LEVEL AT PRESCRIBED FREQUENCY WITHIN MAIN LOBE BAND, BASEBAND TRANSMITTER OR ASK TRANSMITTER USING SUCH METHOD, AND BASEBAND RECEIVER OR ASK RECEIVER DECODING SIGNAL CODED BY SUCH METHOD

(75) Inventors: Yoshihiro Ohtani, Soraku-gun; Hiroshi Uno, Nara; Yutaka Ikeda, Higashiosaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/783,525

(22) Filed: Feb. 14, 2001

Related U.S. Application Data

(63) Continuation of application No. 09/096,989, filed on Jun. 12, 1998, now Pat. No. 6,215,862.

(30) Foreign Application Priority Data

Jun. 12, 1997 (JP) ............................................. 9-155188
Oct. 27, 1997 (JP) ............................................. 9-294250

(51) Int. Cl.[7] ................................................ H04L 5/12
(52) U.S. Cl. ...................................... 375/264; 375/298
(58) Field of Search ................................ 375/261, 259, 375/264, 269, 298, 302, 322

(56) References Cited

U.S. PATENT DOCUMENTS 5,936,578 A * 8/1999 Driessen et al. ............ 329/304
6,204,889 B1 * 3/2001 Endoh et al. ................ 348/231

* cited by examiner

Primary Examiner—Don N. Vo
(74) Attorney, Agent, or Firm—Dike, Bronstein, Roberts & Cushman IP Group Edwards & Angell, LLP; David C. Conlin; Timothy Carter Pledger

(57) ABSTRACT

A method of coding a signal for digital optical communication using a symbol formed of N slots $[s_1, s_2, s_3, \ldots s_N]$, wherein $s_i$ is either 0 or 1 where i is an integer and $1 \leq i \leq N$ is provided. The method includes the steps of determining a plurality of symbols which satisfy the following expression, wherein k is an arbitrary positive integer, and $p_1, q_1, p_2, q_2, \ldots, p_k$ and $q_k$ are integers which satisfy $1 \leq p_1 < q_1$, $1 \leq p_2 < q_2, \ldots, 1 \leq p_k < q_k$, and $p_1/q_1 < p_2/q_2 < \ldots < p_k/q_k$:

$$\left. \begin{array}{l} \sum_{i=1}^{N} s_i \left\{ \cos\left(2\pi \frac{p_1}{q_1}(i-1)\right) - \cos\left(2\pi \frac{p_1}{q_1} i\right) \right\} = 0 \\ \sum_{i=1}^{N} s_i \left\{ \sin\left(2\pi \frac{p_1}{q_1} i\right) - \sin\left(2\pi \frac{p_1}{q_1}(i-1)\right) \right\} = 0 \\ \sum_{i=1}^{N} s_i \left\{ \cos\left(2\pi \frac{p_2}{q_2}(i-1)\right) - \cos\left(2\pi \frac{p_2}{q_2} i\right) \right\} = 0 \\ \sum_{i=1}^{N} s_i \left\{ \sin\left(2\pi \frac{p_2}{q_2} i\right) - \sin\left(2\pi \frac{p_2}{q_2}(i-1)\right) \right\} = 0 \\ \vdots \\ \sum_{i=1}^{N} s_i \left\{ \cos\left(2\pi \frac{p_k}{q_k}(i-1)\right) - \cos\left(2\pi \frac{p_k}{q_k} i\right) \right\} = 0 \\ \sum_{i=1}^{N} s_i \left\{ \sin\left(2\pi \frac{p_k}{q_k} i\right) - \sin\left(2\pi \frac{p_k}{q_k}(i-1)\right) \right\} = 0 \end{array} \right\} \quad (1)$$

and coding transmission data based on the determined plurality of symbols.

16 Claims, 25 Drawing Sheets

210

| TRANSMISSION DATA | | | | PARALLEL SYMBOL PATTERN | | | | | | | |
|---|---|---|---|---|---|---|---|---|---|---|---|
| D3 | D2 | D1 | D0 | P7 | P6 | P5 | P4 | P3 | P2 | P1 | P0 |
| 0 | 0 | 0 | 0 | 1 | 0 | 1 | 0 | 0 | 0 | 0 | 0 |
| 0 | 0 | 0 | 1 | 0 | 1 | 0 | 1 | 0 | 0 | 0 | 0 |
| 0 | 0 | 1 | 0 | 0 | 0 | 1 | 0 | 1 | 0 | 0 | 0 |
| 0 | 0 | 1 | 1 | 0 | 0 | 0 | 1 | 0 | 1 | 0 | 0 |
| 0 | 1 | 0 | 0 | 0 | 0 | 0 | 0 | 1 | 0 | 1 | 0 |
| 0 | 1 | 0 | 1 | 0 | 0 | 0 | 0 | 0 | 1 | 0 | 1 |
| 0 | 1 | 1 | 0 | 0 | 1 | 0 | 0 | 0 | 0 | 1 | 0 |
| 0 | 1 | 1 | 1 | 0 | 1 | 0 | 0 | 0 | 0 | 0 | 1 |
| 1 | 0 | 0 | 0 | 1 | 1 | 1 | 1 | 0 | 0 | 0 | 0 |
| 1 | 0 | 0 | 1 | 0 | 1 | 1 | 1 | 1 | 0 | 0 | 0 |
| 1 | 0 | 1 | 0 | 0 | 0 | 1 | 1 | 1 | 1 | 0 | 0 |
| 1 | 0 | 1 | 1 | 0 | 0 | 0 | 1 | 1 | 1 | 1 | 0 |
| 1 | 1 | 0 | 0 | 0 | 0 | 0 | 0 | 1 | 1 | 1 | 1 |
| 1 | 1 | 0 | 1 | 1 | 0 | 0 | 0 | 0 | 1 | 1 | 1 |
| 1 | 1 | 1 | 0 | 1 | 1 | 0 | 0 | 0 | 0 | 1 | 1 |
| 1 | 1 | 1 | 1 | 1 | 1 | 1 | 0 | 0 | 0 | 0 | 1 |

| TRANSMISSION DATA | | | | PARALLEL SYMBOL PATTERN | | | | | | | |
|---|---|---|---|---|---|---|---|---|---|---|---|
| D3 | D2 | D1 | D0 | P7 | P6 | P5 | P4 | P3 | P2 | P1 | P0 |
| 0 | 0 | 0 | 0 | 1 | 0 | 1 | 0 | 0 | 0 | 0 | 0 |
| 0 | 0 | 0 | 1 | 0 | 1 | 0 | 1 | 0 | 0 | 0 | 0 |
| 0 | 0 | 1 | 0 | 0 | 0 | 1 | 0 | 1 | 0 | 0 | 0 |
| 0 | 0 | 1 | 1 | 0 | 0 | 0 | 1 | 0 | 1 | 0 | 0 |
| 0 | 1 | 0 | 0 | 0 | 0 | 0 | 0 | 1 | 0 | 1 | 0 |
| 0 | 1 | 0 | 1 | 0 | 0 | 0 | 0 | 0 | 1 | 0 | 1 |
| 0 | 1 | 1 | 0 | 1 | 0 | 0 | 0 | 0 | 0 | 1 | 0 |
| 0 | 1 | 1 | 1 | 0 | 1 | 0 | 0 | 0 | 0 | 0 | 1 |
| 1 | 0 | 0 | 0 | 1 | 1 | 1 | 1 | 0 | 0 | 0 | 0 |
| 1 | 0 | 0 | 1 | 0 | 1 | 1 | 1 | 1 | 0 | 0 | 0 |
| 1 | 0 | 1 | 0 | 0 | 0 | 1 | 1 | 1 | 1 | 0 | 0 |
| 1 | 0 | 1 | 1 | 0 | 0 | 0 | 1 | 1 | 1 | 1 | 0 |
| 1 | 1 | 0 | 0 | 0 | 0 | 0 | 0 | 1 | 1 | 1 | 1 |
| 1 | 1 | 0 | 1 | 1 | 0 | 0 | 0 | 0 | 1 | 1 | 1 |
| 1 | 1 | 1 | 0 | 1 | 1 | 0 | 0 | 0 | 0 | 1 | 1 |
| 1 | 1 | 1 | 1 | 1 | 1 | 1 | 0 | 0 | 0 | 0 | 1 |

| PARALLEL SYMBOL PATTERN | | | | | | | | RECEIVED DATA | | | |
|---|---|---|---|---|---|---|---|---|---|---|---|
| P7 | P6 | P5 | P4 | P3 | P2 | P1 | P0 | D3 | D2 | D1 | D0 |
| 1 | 0 | 1 | 0 | 0 | 0 | 0 | 0 | 0 | 0 | 0 | 0 |
| 0 | 1 | 0 | 1 | 0 | 0 | 0 | 0 | 0 | 0 | 0 | 1 |
| 0 | 0 | 1 | 0 | 1 | 0 | 0 | 0 | 0 | 0 | 1 | 0 |
| 0 | 0 | 0 | 1 | 0 | 1 | 0 | 0 | 0 | 0 | 1 | 1 |
| 0 | 0 | 0 | 0 | 1 | 0 | 1 | 0 | 0 | 1 | 0 | 0 |
| 0 | 0 | 0 | 0 | 0 | 1 | 0 | 1 | 0 | 1 | 0 | 1 |
| 1 | 0 | 0 | 0 | 0 | 0 | 1 | 0 | 0 | 1 | 1 | 0 |
| 0 | 1 | 0 | 0 | 0 | 0 | 0 | 1 | 0 | 1 | 1 | 1 |
| 1 | 1 | 1 | 1 | 0 | 0 | 0 | 0 | 1 | 0 | 0 | 0 |
| 0 | 1 | 1 | 1 | 1 | 0 | 0 | 0 | 1 | 0 | 0 | 1 |
| 0 | 0 | 1 | 1 | 1 | 1 | 0 | 0 | 1 | 0 | 1 | 0 |
| 0 | 0 | 0 | 1 | 1 | 1 | 1 | 0 | 1 | 0 | 1 | 1 |
| 0 | 0 | 0 | 0 | 1 | 1 | 1 | 1 | 1 | 1 | 0 | 0 |
| 1 | 0 | 0 | 0 | 0 | 1 | 1 | 1 | 1 | 1 | 0 | 1 |
| 1 | 1 | 0 | 0 | 0 | 0 | 1 | 1 | 1 | 1 | 1 | 0 |
| 1 | 1 | 1 | 0 | 0 | 0 | 0 | 1 | 1 | 1 | 1 | 1 |

112

METHOD OF CODING SIGNAL FOR DIGITAL OPTICAL COMMUNICATION HAVING SPECTRUM WHICH ATTAINS ZERO LEVEL AT PRESCRIBED FREQUENCY WITHIN MAIN LOBE BAND, BASEBAND TRANSMITTER OR ASK TRANSMITTER USING SUCH METHOD, AND BASEBAND RECEIVER OR ASK RECEIVER DECODING SIGNAL CODED BY SUCH METHOD

This application is a continuation of U.S. application Ser. No. 09/096,989, filed Jun. 12, 1998, now U.S. Pat. No. 6,215,862, the teachings of which are incorporated herein by reference.

BACKGROUND OF THE INVENTION

1. Field of the Invention

The present invention relates generally to methods of coding a signal for digital optical communication for use in electric home appliances and information equipment capable of infrared communication, and more particularly, to a method of coding a signal for digital optical communication, the spectrum of which attains a zero level at a prescribed frequency within a main lobe band, a baseband transmitter or an ASK transmitter using the method, and a baseband receiver or an ASK receiver decoding a signal coded by the method.

2. Description of the Related Art

Conventional digital optical coding methods are roughly divided into coding method using a subcarrier and coding methods without using a subcarrier. Herein, the subcarrier refers to a carrier wave artificially created by turning on/off light at a certain cycle. A rectangular wave of light simply turning on/off is often substituted for the subcarrier. A method of deforming the waveform of a signal for communication data by a prescribed rule for transmission without using the subcarrier is called a baseband coding method. Meanwhile, a method of transmitting communication data by changing any of a amplitude, phase and frequency of a subcarrier based on the data is called a carrier band coding method.

Example of Conventional Baseband Coding Method

As examples of the baseband coding method, NRZ (Non Return to Zero), RZ (Return to Zero), PPM (Pulse Position Modulation) and Manchester coding methods are known. Coding waveforms for these coding methods are set forth in FIG. 1.

Spectrum According to Conventional Baseband Coding Methods

A spectrum according to a baseband coding method generally has a main lobe having its highest power spectrum density in the low frequency region, and a side lobe having its power spectrun density reduced in higher frequency regions. The width of a side band of the main lobe in this case is usually the reciprocal of the minimum pulse width used in that coding method. For example, since the minimum pulse width of an NRZ signal is equal to 1-bit time (time necessary for transmitting 1 bit), the band width of the main lobe is equal to the bit rate. If the bit rate is 100 Kbps, for example, the band width of the main lobe is 100 kHz.

According to the 1/2 RZ coding method, 4-value PPM coding method or Manchester coding method, since the minimum pulse width is equal to half 1-bit time, and therefore the band width of the main lobe is twice as large as the bit rate. If the bit rate is 100 Kbps, for example, the band width of the main lobe is 200 kHz. The minimum pulse width is usually set at a value equal to or lower than 1-bit time.

Stated differently, in a normal communication method, the main lobe has a band width equal to or larger than the bit rate. Spectra according to the above coding methods are shown in FIGS. 2 to 5. As can be clearly seen from these graphs, the zero level of each spectrum does not lie within the main lobe band according to the conventional coding methods, and the spectrum is present in the entire main lobe frequency band.

As a special conventional example, Japanese Patent Laying-open No. 7-107125 discloses a method of communicating by repeating the same symbol at least twice. In the communication method, the zero level of a spectrum appears within the main lobe band. For example, transmission waveforms and spectra when each symbol according to the 4-value PPM method is repeated twice for transmission are shown in FIGS. 6 and 7. According to the coding method, the pulse width is reduced as compared to the bit rate, and the main lobe width of the spectrum increases, which generally makes it difficult to design a receiver.

Examples of Conventional Carrier Band Coding Methods

Meanwhile, among various carrier band coding methods, the simplest is a method of changing the amplitude, which is called "ASK (Amplitude Shift Keying)" method. Among ASK methods, the simplest method uses two kinds of amplitudes, in other words a prescribed amplitude and amplitude zero, which is called "OOK (On Off Keying)". Coding methods by superposing on an output signal according to each of the conventional baseband coding methods a subcarrier for transmission may be considered, which are also ASK coding methods in a broad sense. The coding waveforms according to these methods are set forth in FIG. 8. Methods of coding by changing the phase or frequency of the subcarrier are called PSK (Phase Shift Keying) method, and FSK (Frequency Shift Keying) method, respectively (see PSK and FSK coding waveforms in FIG. 9).

Spectrum According to Conventional Carrier Band Coding Methods

A spectrum according to a carrier band coding method has a main lobe in a frequency band around a subcarrier frequency. In a method which uses a plurality of subcarrier frequencies as the FSK method, there are a plurality of main lobes in frequency bands around the subcarrier frequencies. The width of a sideband of a main lobe according to a carrier band coding method is normally the reciprocal of the minimum "subcarrier non-changing time" used in the coding method.

Spectrum According to Conventional Carrier Band Coding Method, Particularly ASK Coding Method A spectrum according to an ASK coding method in which a subcarrier is superposed on an output signal according to a baseband coding method is produced by shifting a spectrum according to the original baseband coding method to a frequency band around the subcarrier. In this case, however, the spectrum according to the baseband coding method does not entirely shift to the high frequency band, and a certain amount of the spectrum according to the baseband coding method remains as unnecessary radiation in the low frequency band. Spectra according to ASK coding methods produced by superposing subcarriers on the output signals accordingly to the baseband coding methods are set forth in FIGS. 10 to 13.

Spectrum According to Conventional Carrier Band Coding Method, Particularly PSK and FSK Coding Methods Meanwhile, in a PSK or FSK method, no spectrum appears in the low frequency band unlike the ASK methods. These methods, however, generally consume more electric power than the ASK methods, and require complex receiving circuit configurations, and therefore the ASK methods or baseband methods are preferred in the field of optical communication.

As can be seen from the foregoing, in the baseband communication methods and ASK communication methods, a spectrum having a main lobe of a band width equal to or larger than the bit rate appears in the low frequency band. Therefore, if communication devices using a plurality of communication methods are used, mutual interference between them is caused.

If, however, remote controls for TV sets usually employ an ASK communication method at a bit rate of about 1 Kbps, using a subcarrier at around 40 kHz, the spectrum of which has a main lobe of about 2 kHz on one side around the vicinity of 40 kHz. Assuming that another method is newly employed for communication at about 75 Kbps, and a baseband coding method or an ASK communication method is employed, a signal spectrum appears in the entire low frequency band up to about 0 Hz −75 kHz area, which interferes with the optical communication of the remote controll. More specifically, according to a conventional baseband coding method or an ASK coding method, interference between communication at 75 Kbps and remote communication at 40 kHz may be hardly avoided.

If a PSK or FSK coding method is used rather than an ASK coding method, no spectrum appears in the low frequency band, and the interference may be avoided. In this case, however, the configuration on the receiver side is more complicated than the case of using an ASK coding method, which increases the cost.

If a coding method of creating a gap in a spectrum by transmitting a symbol at least twice, in order to avoid such interference, is used, the pulse width is narrowed relative to the bit rate, and the main lobe expands, which makes it difficult to design a receiver.

SUMMARY OF THE INVENTION

It is an object of the present invention to provide a method of coding a signal for digital optical communication, which permits coding of transmission data without causing another optical communication device to erroneously operate in optical communication.

Another object of the invention is to provide a baseband transmitter capable of coding transmission data for optical communication, without causing another optical communication device to erroneously operate.

Yet another object of the invention is to provide a baseband receiver capable of decoding received coded transmission data, without causing another optical communication device to erroneously operate in optical communication.

A still further object of the invention is to provide an ASK transmitter capable of coding transmission data without causing another optical communication device to erroneously operate in optical communication.

An additional object of the present invention is to provide an ASK receiver capable of decoding received coded transmission data without causing another optical communication device to erroneously operate in optical communication.

According to one aspect of the present invention, a method of coding a signal for digital optical communication uses a symbol formed of N slots $[S_1, S_2, S_3, \ldots, S_N]$, wherein $S_i$ is one of 0 and 1 if $1 \leq i \leq N$.

The method includes the steps of determining a plurality of symbols which satisfy the following expression, wherein k is an arbitrary positive integer, $p_1, q_1, p_2, q_2, \ldots, p_k, q_k$ are integers which satisfy $1 \leq p_1 < q_1, 1 \leq p_2 < q_2, \ldots, 1 \leq p_k < q_k$, $p_1/q_1 < p_2/q_2 < \ldots < p_k/q_k$:

$$\left. \begin{aligned} \sum_{i=1}^{N} s_i \left\{ \cos\left(2\pi \frac{P_1}{q_1}(i-1)\right) - \cos\left(2\pi \frac{P_1}{q_1}i\right) \right\} &= 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} &= 0 \\ \sum_{i=1}^{N} s_i \left\{ \cos\left(2\pi \frac{P_2}{q_2}(i-1)\right) - \cos\left(2\pi \frac{P_2}{q_2}i\right) \right\} &= 0 \\ \sum_{i=1}^{N} s_i \left\{ \sin\left(2\pi \frac{P_2}{q_2}i\right) - \sin\left(2\pi \frac{P_2}{q_2}(i-1)\right) \right\} &= 0 \\ &\vdots \\ \sum_{i=1}^{N} s_i \left\{ \cos\left(2\pi \frac{P_k}{q_k}(i-1)\right) - \cos\left(2\pi \frac{P_k}{q_k}i\right) \right\} &= 0 \\ \sum_{i=1}^{N} s_i \left\{ \sin\left(2\pi \frac{P_k}{q_k}i\right) - \sin\left(2\pi \frac{P_k}{q_k}(i-1)\right) \right\} &= 0 \end{aligned} \right\} \quad (1)$$

and coding transmission data based on said determined plurality of symbols.

By determining a plurality of symbols which satisfy Expression (1), a spectrum may have a zero level at a particular frequency, so that another optical communication device may perform optical communication at that particular frequency without erroneous operation.

According to another aspect of the present invention, a baseband transmitter uses a symbol formed of N slots $[S_1, S_2, S_3, \ldots, S_N]$, wherein $S_i$ is one of 0 and 1 if i is an integer and $1 \leq i \leq N$, the transmitter includes a coding portion for coding transmission data based on a plurality of symbols which satisfy Expression (1) and outputting the coded data as a symbol pattern, if k is an arbitrary positive integer, and $p_1, q_1, p_2, q_2, \ldots, p_k$ and $q_k$ are integers which satisfy $1 \leq p_1 < q_1, 1 \leq p_2 < q_2, \ldots, 1 \leq p_k < q_k, p_1/q_1 < p_2/q_2 < p_k/q_k$: and an E/O conversion portion for converting the symbol pattern output by the coding portion into an optical signal.

The transmission data is coded based on the plurality of symbols which satisfy Expression (1), in the baseband transmitter, a spectrum has a zero level at a particular frequency, and therefore another optical communication device can perform optical communication at that particular frequency without erroneous operation.

According to yet another aspect of the present invention, a baseband receiver uses a symbol formed of N slots $[S_1, S_2, S_3, \ldots, S_n]$, wherein $S_i$ is one of 0 and 1 if i is an integer and $1 \leq i \leq N$. The baseband receiver includes an O/E conversion portion for converting a received optical signal pattern into a symbol pattern; and a decoding portion for decoding the symbol pattern based on a plurality of symbols which satisfy Expression (1), thereby generating received data, wherein k is an arbitrary positive integer, and $p_1, q_1, p_2, q_2, \ldots, p_k, q_k$ are integers wich satisfy $1 \leq p_1 < q_1$, $1 \leq p_2 < q_2, \ldots, 1 \leq p_k < q_k$, and $p_1/q_1 < p_2/q_2 < \ldots < p_k/q_k$.

Since a symbol pattern is decoded based on a plurality of symbols which satisfy Expression (1), the baseband receiver can decode received coded data so that the spectrum has a zero level at a particular frequency, another optical communication device can perform optical communication at that particular frequency without erroneous operation.

A still further aspect of the present invention, an ASK transmitter uses a symbol formed of N slots $[S_1, S_2, S_3, \ldots, S_N]$, wherein $S_i$ is one of 0 and 1 if i is an integer and $1 \leq i \leq N$. The transmitter includes a coding portion for coding transmission data based on a plurality of symbols which satisfy Expression (1) and outputting the coded data as a symbol pattern, wherein k is an arbitrary positive integer, and $p_1, q_1, p_2, q_2, \ldots, p_k$ and $q_k$ are integers which satisfy $1 \leq p_1 < q_1$, $1 \leq p_2 < q_2, \ldots, 1 \leq p_k < q_k$, and $p_1/q_1 < p_2/q_2 < p_k/q_k$; a modulation portion for superposing a subcarrier on the symbol pattern output from the coding portion and generating a transmission electrical signal pattern; and an E/O conversion portion for converting the electrical signal pattern generated by the modulation portion into an optical signal.

Since transmission data is coded based on a plurality of symbols which satisfy Expression (1), the ASK transmitter can have a zero level in a spectrum at a particular frequency, and therefore another optical communication device may perform optical communication at that particular frequency without erroneous operation.

According to an additional aspect of the present invention, an ASK receiver uses a symbol formed of N slots $[S_1, S_2, S_3, \ldots, S_N]$, wherein $S_i$ is one of 0 and 1 if i is an integer and $1 \leq i \leq N$. The ASK receiver includes an O/E conversion portion for converting a received optical signal pattern into an electrical signal pattern, a detection portion for detecting the electrical signal pattern and generating a symbol pattern, and a decoding portion for decoding the symbol pattern based on a plurality of symbols which satisfy Expression (1) and generating received data, wherein k is an arbitrary positive integer, and $p_1, q_1, p_2, q_2, \ldots, p_k$ and $q_k$ are integers which satisfy $1 \leq p_1 < q_1$, $1 \leq p_2 < q_2, \ldots$, $1 \leq p_k < q_k$, and $p_1/q_1 < p_2/q_2 < \ldots < p_k/q_k$.

Since a symbol pattern is decoded based on a plurality of symbols which satisfy Expression (1), the ASK receiver can decode transmission data coded such that a spectrum has a zero level at a particular frequency, and therefore another optical communication device may perform optical communication at that particular frequency without erroneous operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a table showing the contents of a conversion table (210) according to a first embodiment of the invention;

FIG. 17 is a table showing the contents of a conversion table (222) according to the first embodiment;

DESCRIPTION OF THE PREFERRED EMBODIMENTS

Figure 1:
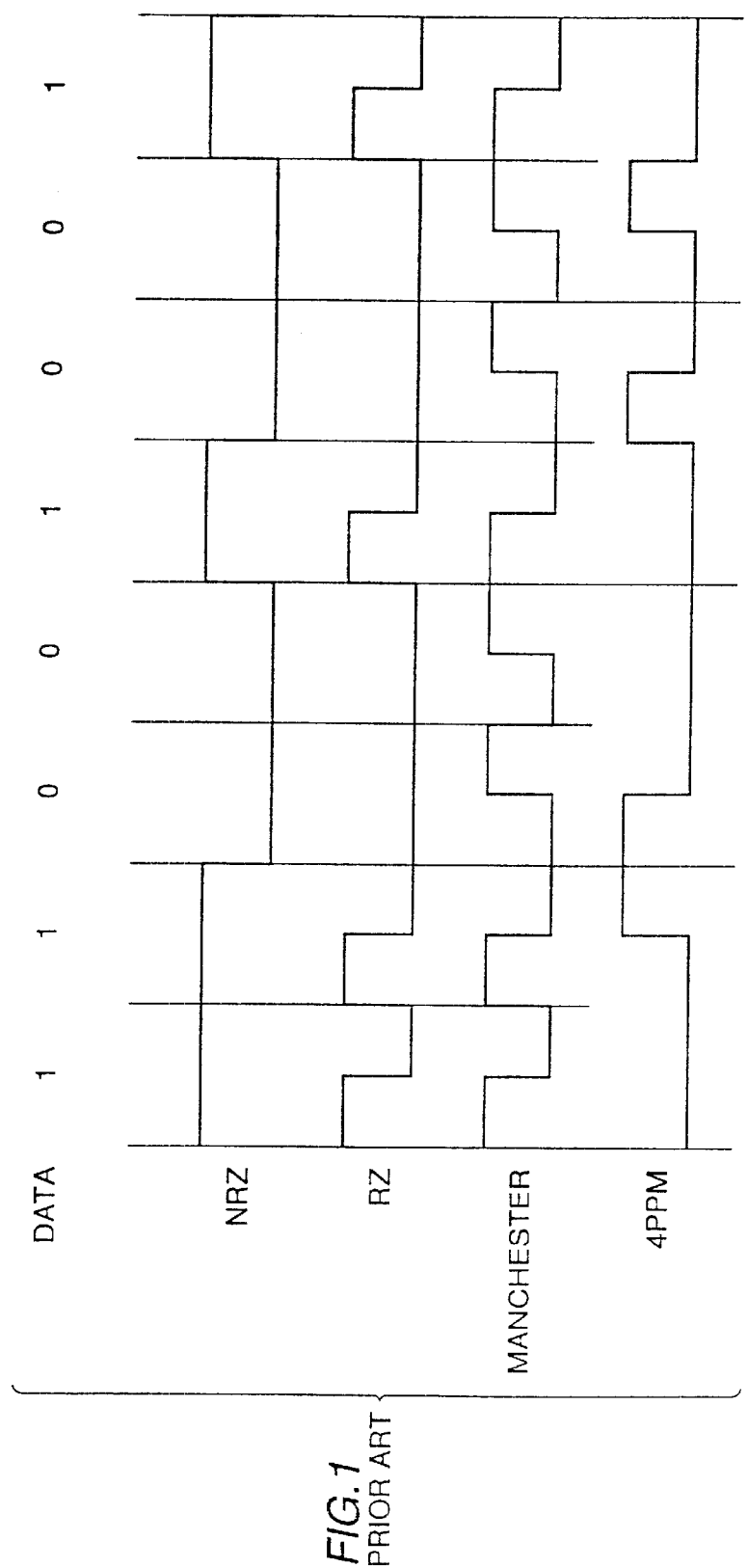
FIG. 1 is a chart of waveforms according to conventional baseband coding methods.
Figure 2:
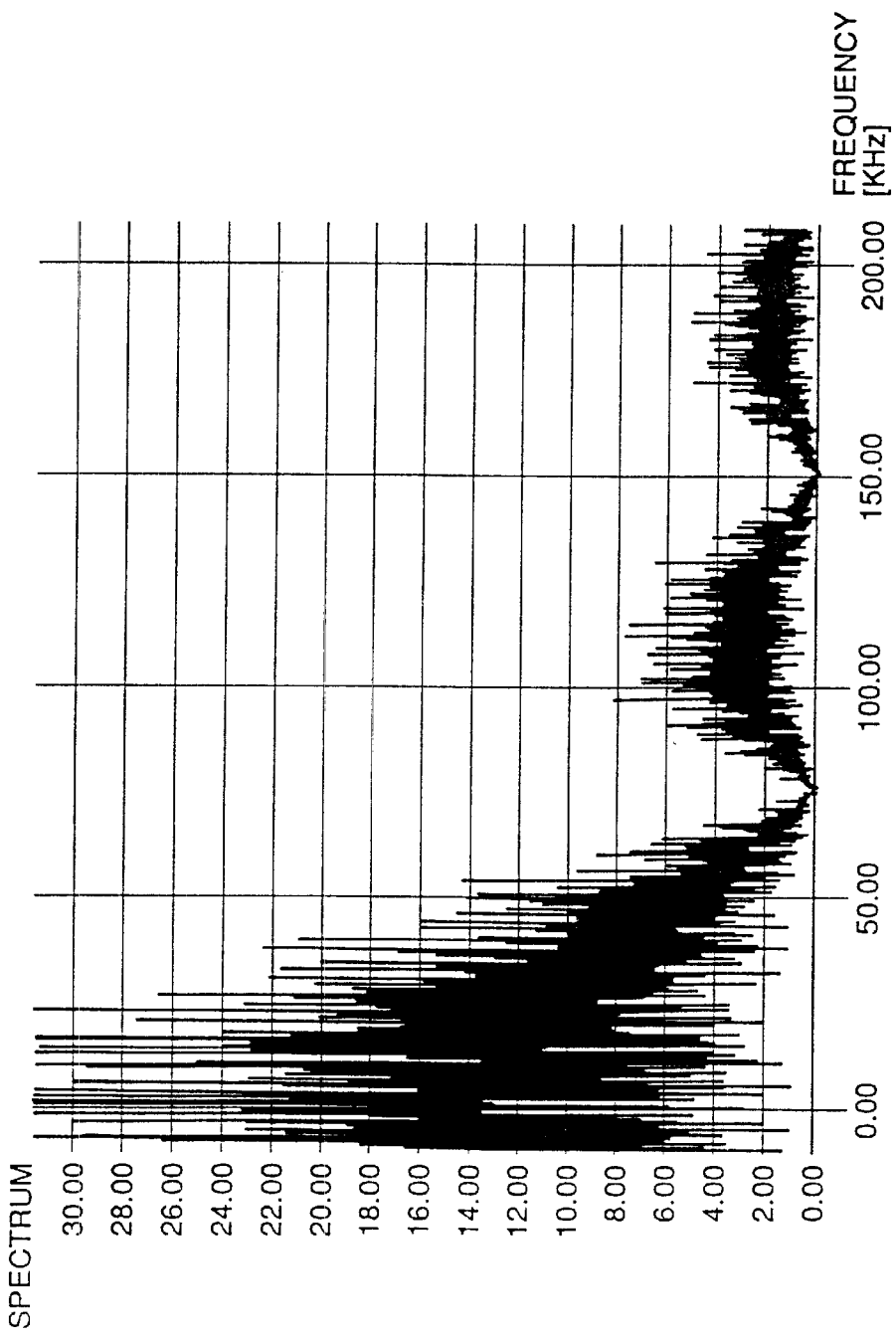
FIG. 2 is a graph showing the signal spectrum of a waveform according to conventional NRZ coding.
Figure 3:
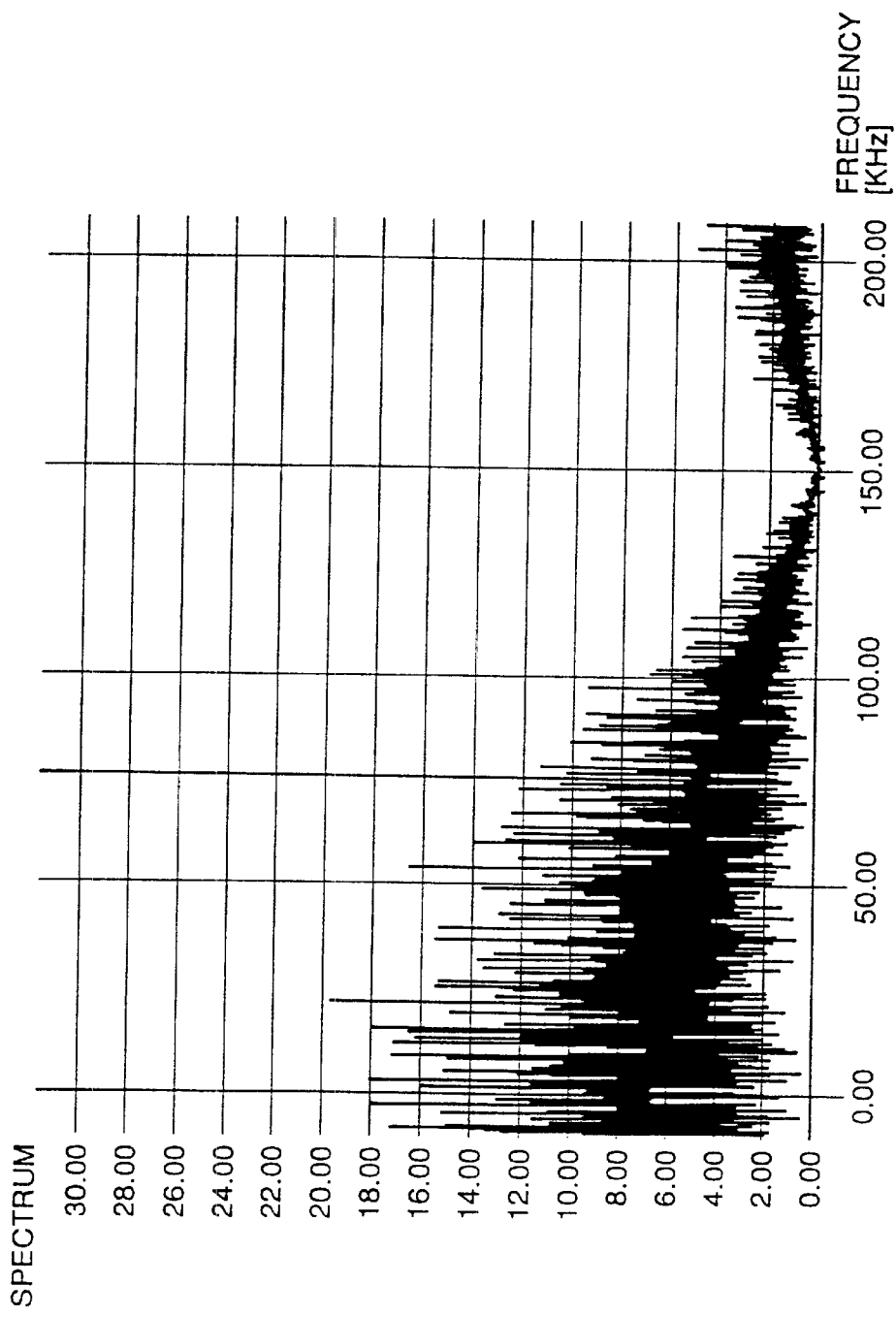
FIG. 3 is a graph showing the signal spectrum of a waveform according to conventional 1/2 RZ coding.
Figure 4:
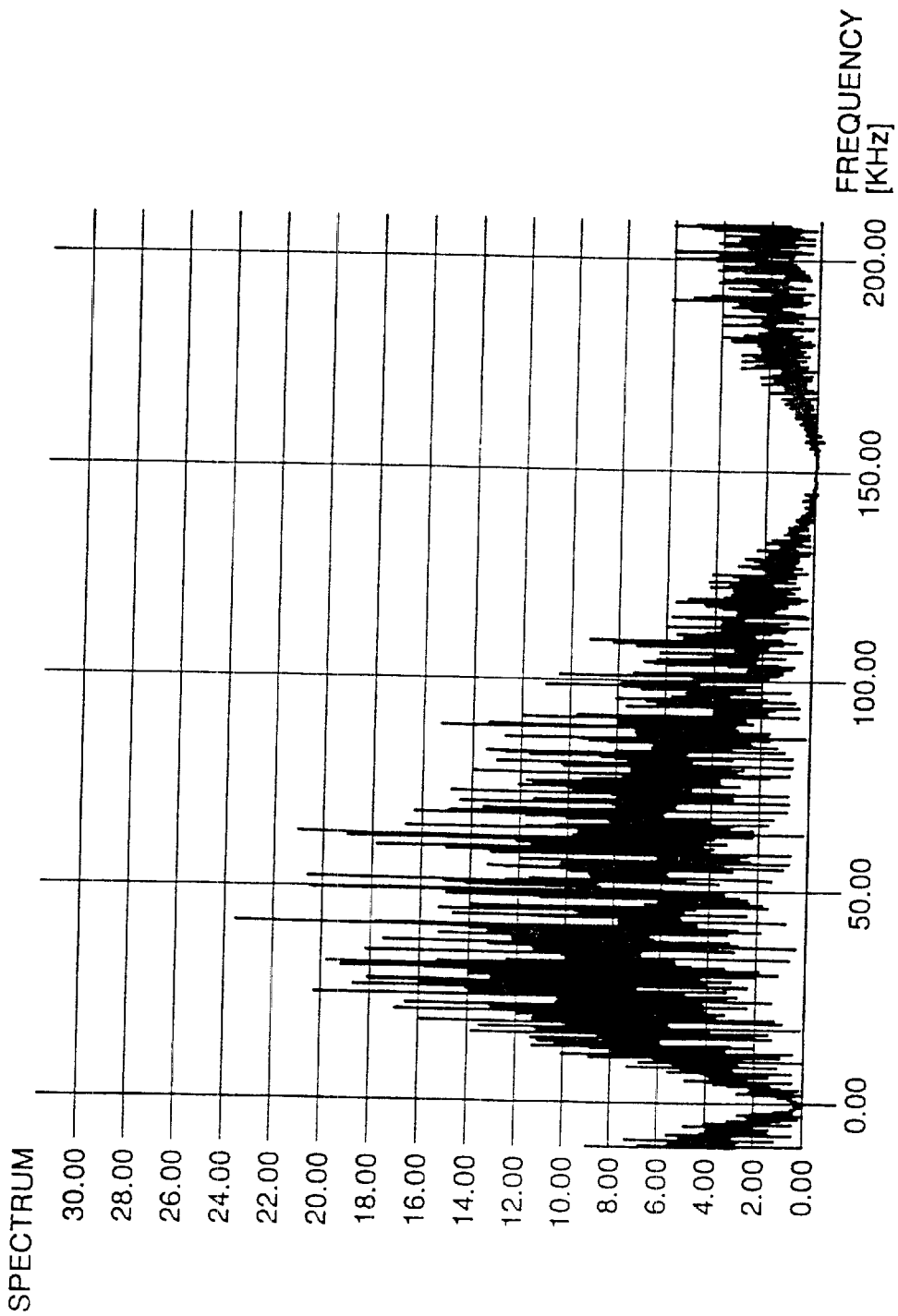
FIG. 4 is a graph showing the signal spectrum of a waveform according to conventional 4PPM coding.
Figure 5:
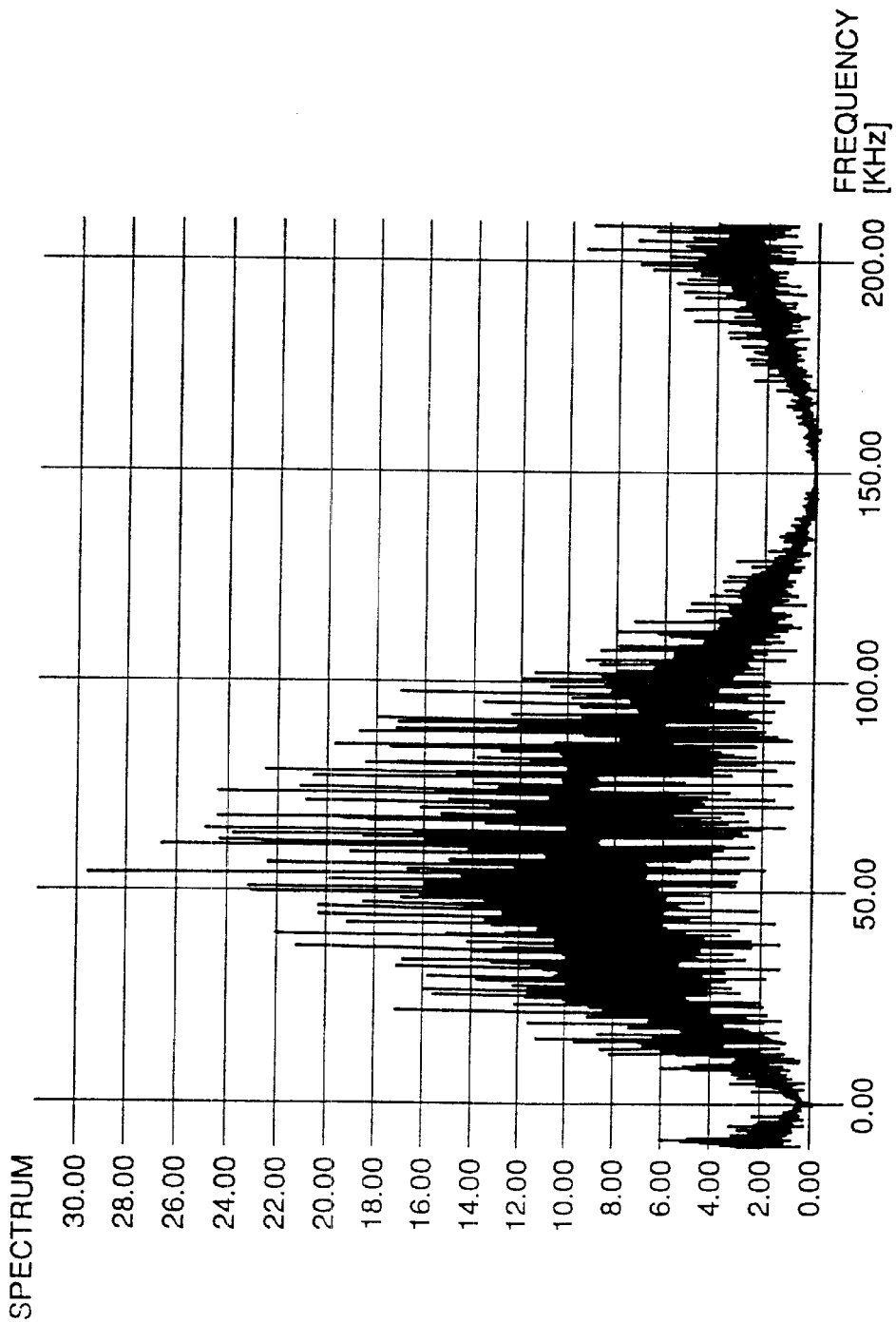
FIG. 5 is a graph showing the signal spectrum of a waveform according to conventional Manchester coding.
Figure 6:
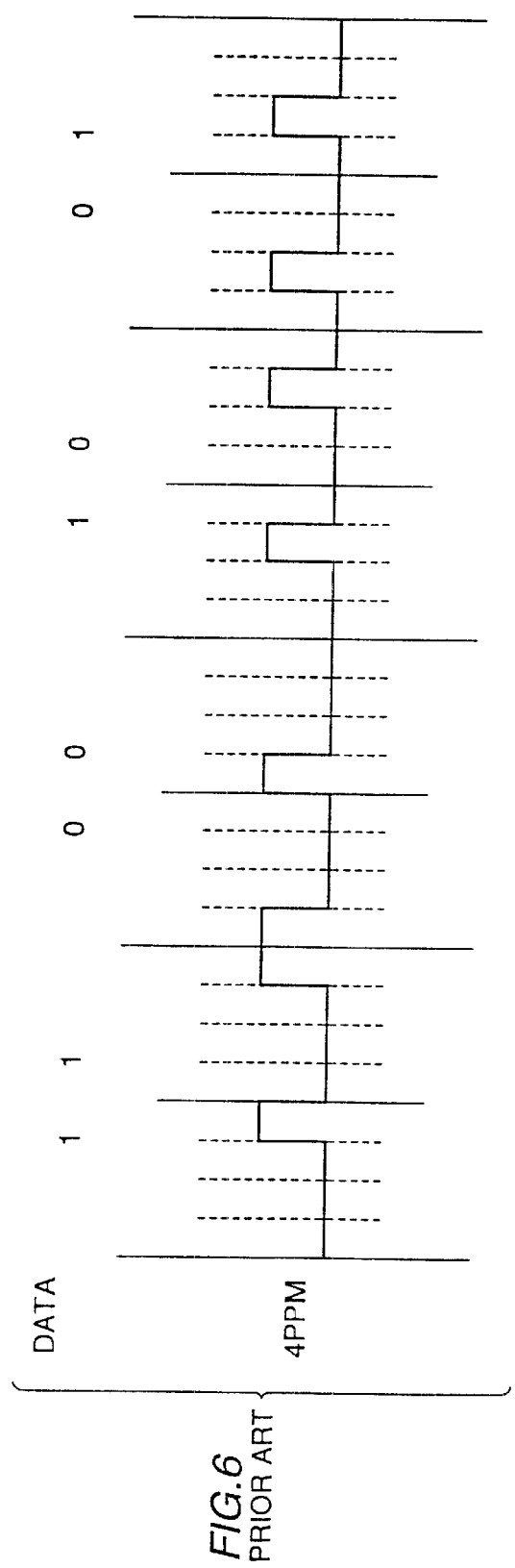
FIG. 6 is a waveform chart in transmission when a conventional 4PPM symbol is repeated twice and coded.
Figure 7:
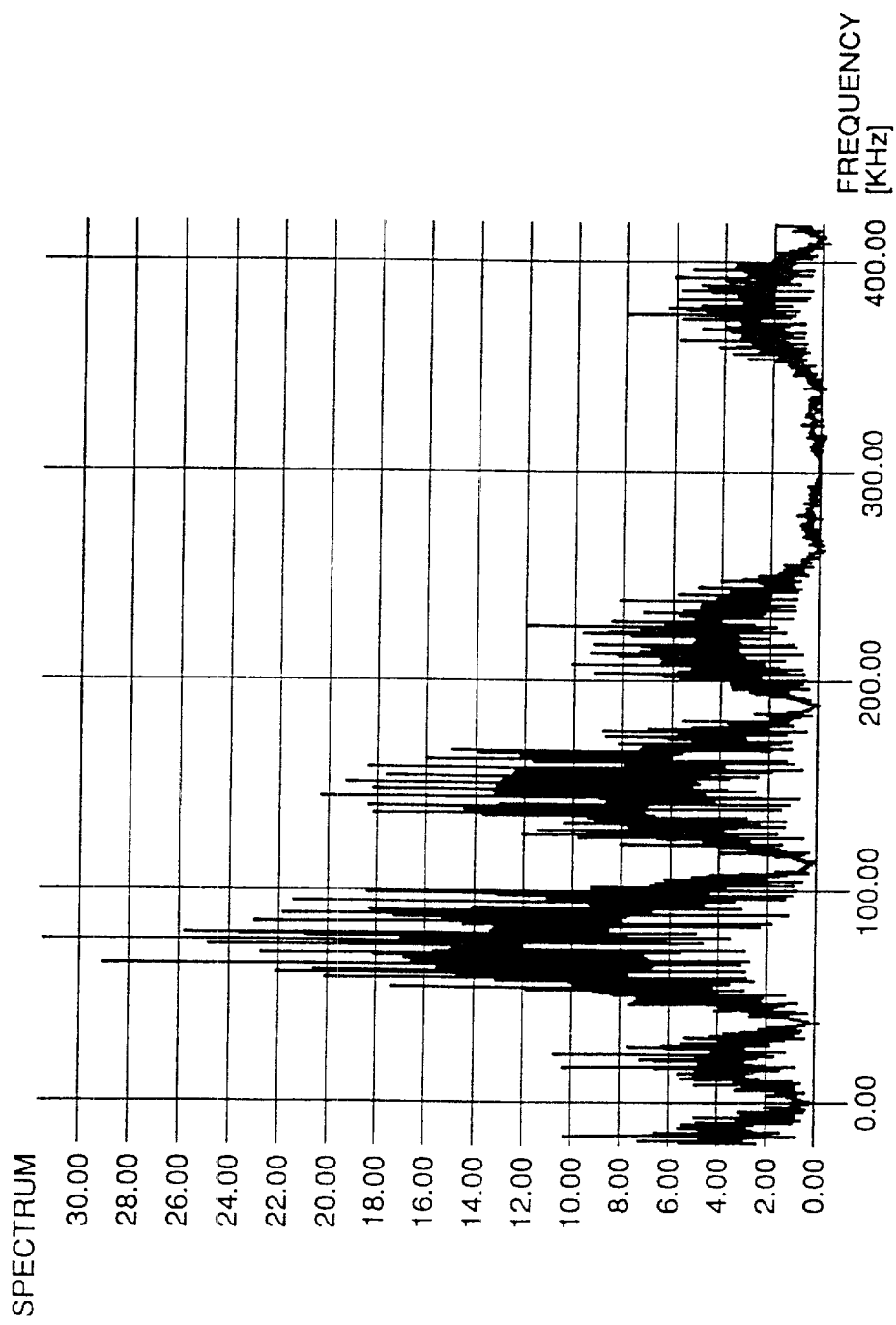
FIG. 7 is a graph showing the signal spectrum of a transmission waveform when a conventional 4PPM symbol is repeated twice and coded.
Figure 8:
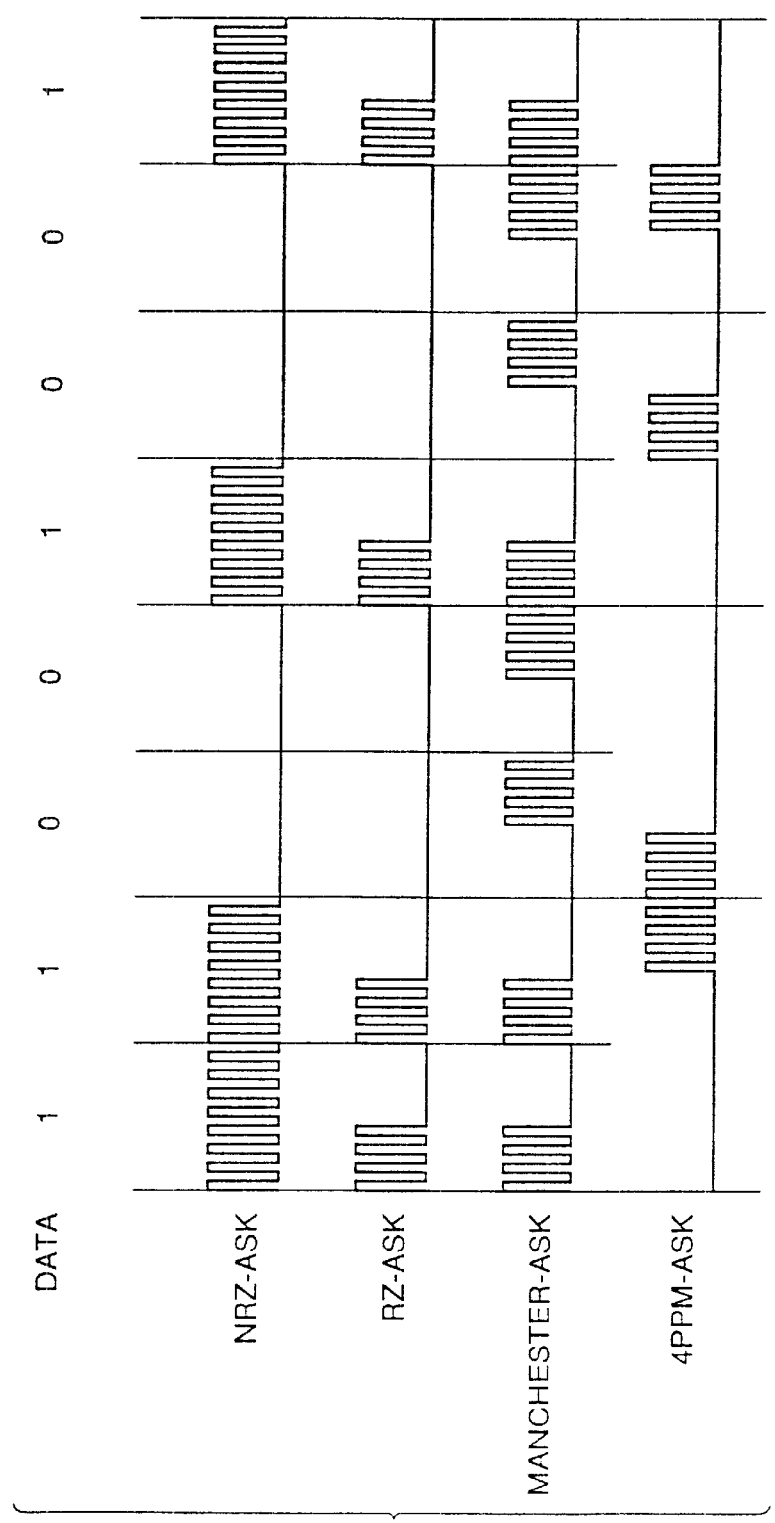
FIG. 8 is a chart of waveforms according to ASK coding produced by superposing a subcarrier on a conventional baseband coding waveform.
Figure 9:
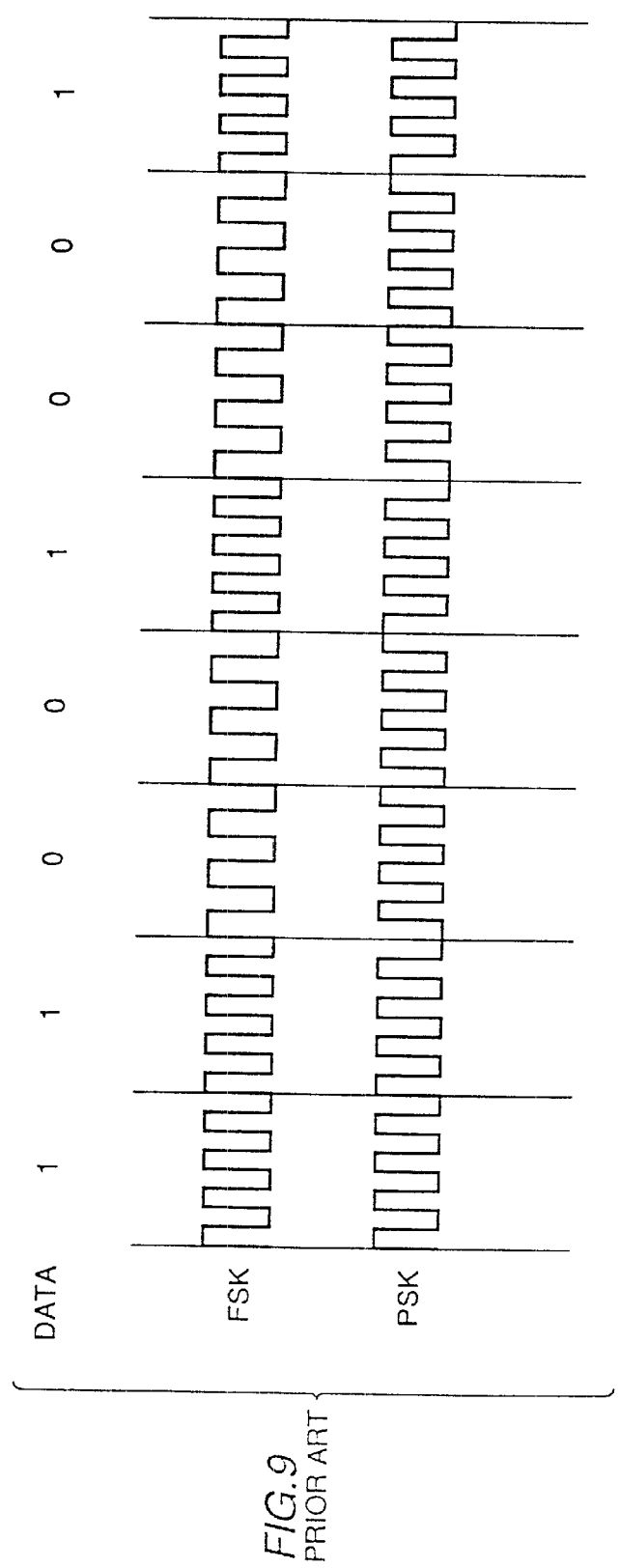
FIG. 9 is a waveform chart according to conventional FSK and PSK coding.
Figure 10:
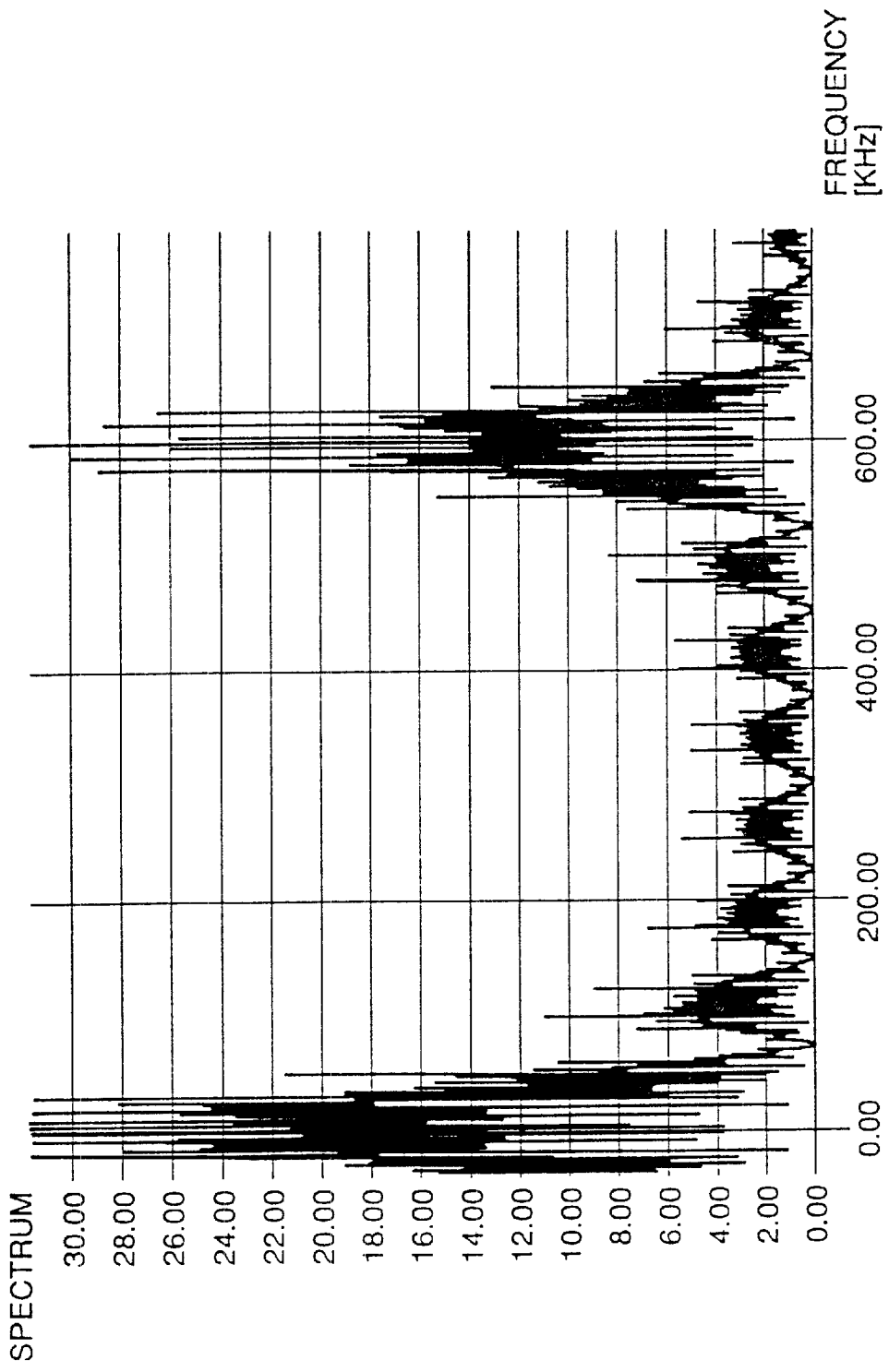
FIG. 10 is a graph showing the signal spectrum of a waveform according to ASK coding produced by superposing a subcarrier on a conventional NRZ coding waveform.
Figure 11:
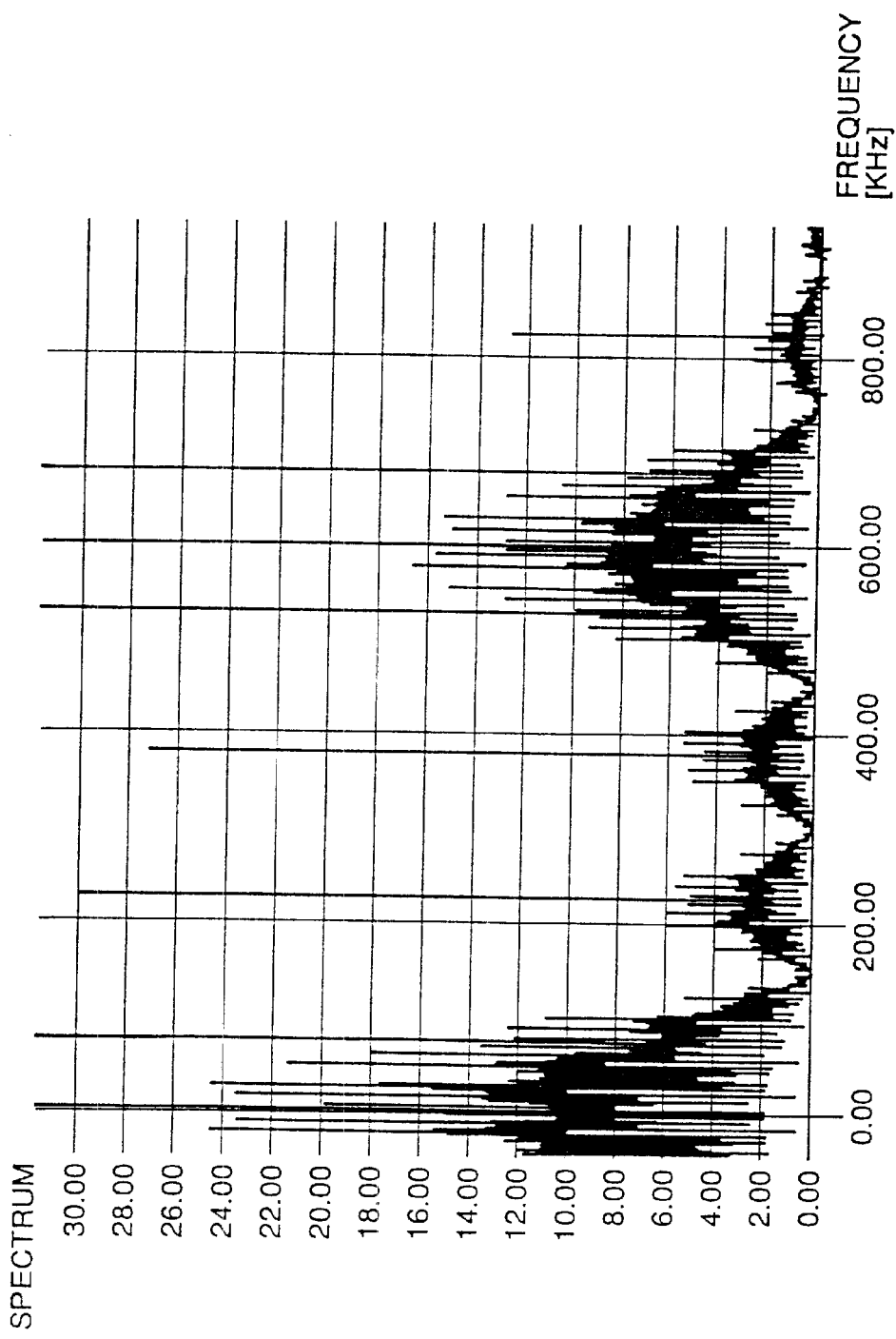
FIG. 11 is a graph showing the signal spectrum of a waveform according to ASK coding produced by superposing a subcarrier on a conventional 1/2 RZ coding waveform.
Figure 12:
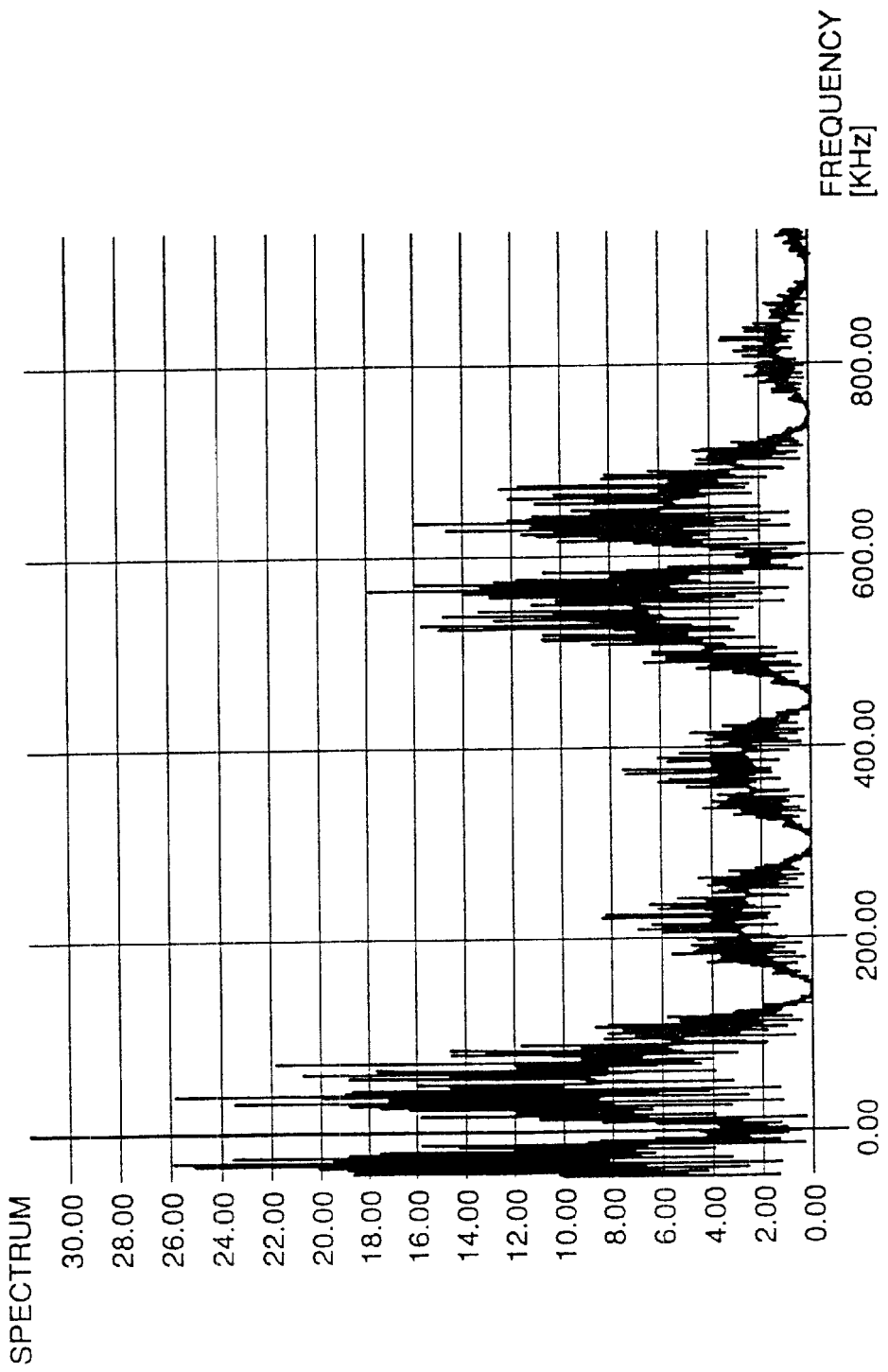
FIG. 12 is a graph showing the signal spectrum of a waveform according to ASK coding produced by superposing a subcarrier on a conventional 4PPM coding waveform.
Figure 13:
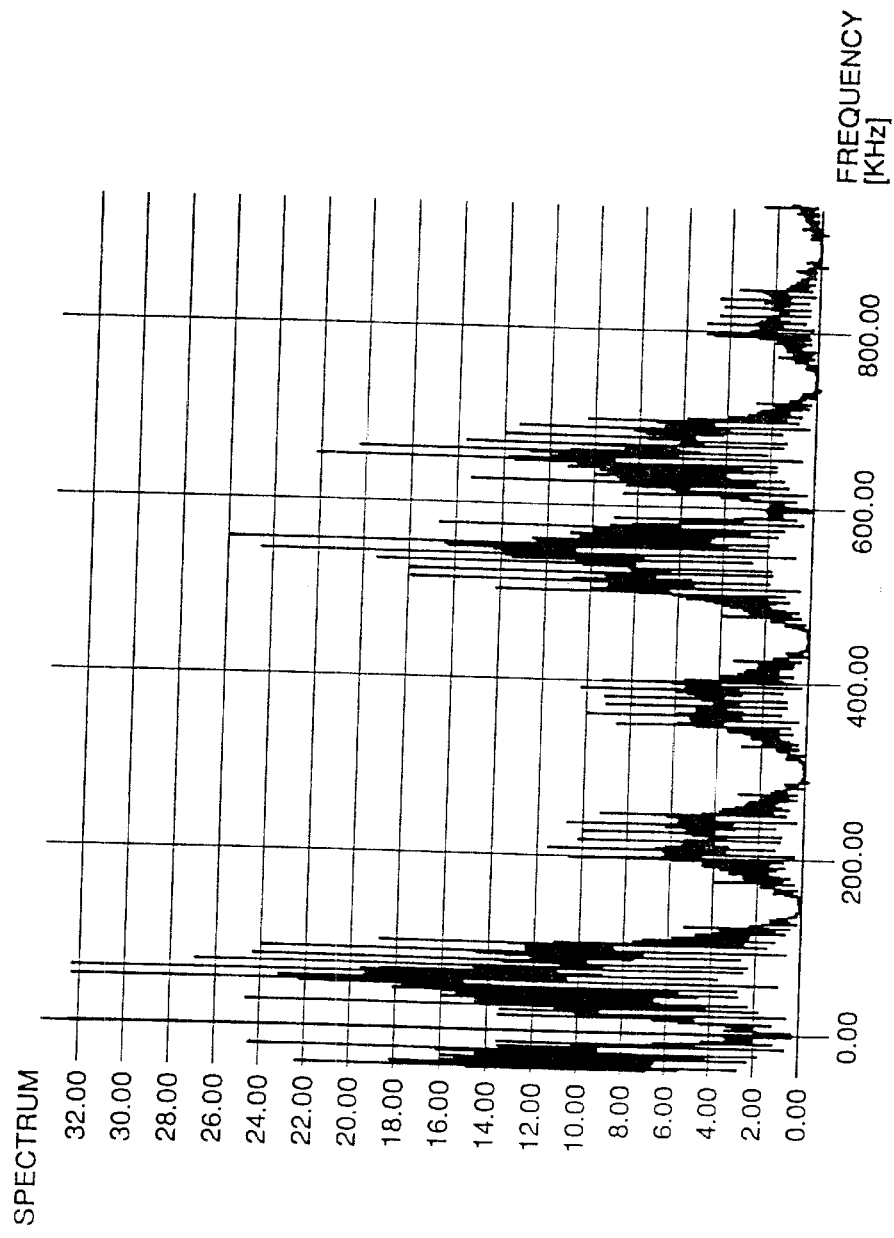
FIG. 13 is a graph showing the signal spectrum of a waveform according to ASK coding produced by superposing a subcarrier on a conventional Manchester coding waveform.

In a coding method according to the present invention, N slots $[s_1, s_2, s_3, \ldots, s_N]$ (wherein $s_i$ ($1 \leq i \leq N$)=0 or 1, the "1" slot represents emission, and the "0" slot represents non-emission). If one slot time is T0, the main lobe width of the spectrum of a signal using the symbol is produced as 1/T0. A particular frequency in the main lobe is defined as follows:

$$\begin{aligned} f_{s1} &= \frac{\omega_{s1}}{2\pi} = \frac{P_1}{q_1}\left(\frac{1}{T_0}\right) \\ f_{s2} &= \frac{\omega_{s2}}{2\pi} = \frac{P_2}{q_2}\left(\frac{1}{T_0}\right) \\ &\vdots \\ f_{sk} &= \frac{\omega_{sk}}{2\pi} = \frac{P_k}{q_k}\left(\frac{1}{T_0}\right) \end{aligned} \quad (2)$$

wherein k is an arbitrary positive integer, and $p_1$, $q_1$, $p_2$, $q_2$, ..., $p_k$ and $q_k$ are integers which satisfy $1 \leq p_1 \leq q_1$, $1 \leq p_2 < q_2$ ... $1 \leq p_k < q_k$, and $p_1/q_1 < q_2/q_2$ ... $< p_k/q_k$. In order that the signal spectrum at the particular frequency defined by Expression (2) has a zero level, a group of symbols which satisfy Expression (1) are used. By setting this particular frequency to a frequency in the range from 30 kHz to 40 kHz, or 56.8 kHz ±2 kHz, the frequency band of infrared communication such as conventional remote control devices, interference with such devices may be eliminate.

Function s(t) is defined as follows:

$$s(t) = \begin{cases} s_1 & \text{(for } (i-1)\,T_0 \leq t \leq iT_0) \\ 0 & \text{(for } t < 0, NT_0 < t) \end{cases} \quad (3)$$

When the spectrum component at the particular frequency given by Expression (2) is calculated, the following expression is obtained:

$$\begin{aligned} \int_0^{NT_0} s(t)\sin\omega_{s1}t\,dt &= \sum_{i=1}^{N} \int_{(i-1)T_0}^{iT_0} s_i \sin\omega_{s1}t\,dt \\ &= \sum_{i=1}^{N} \left[ s_i \frac{-\cos\omega_{s1}t}{\omega_{s1}} \right]_{(i-1)T_0}^{iT_0} \\ &= \frac{1}{\omega_{s1}} \sum_{i=1}^{N} s_i \left\{ \cos\left(2\pi\frac{P_1}{q_1}(i-1)\right) - \cos\left(2\pi\frac{P_1}{q_1}i\right) \right\} \\ \int_0^{NT_0} s(t)\cos\omega_{s1}t\,dt &= \sum_{i=1}^{N} \int_{(i-1)T_0}^{iT_0} s_i \cos\omega_{s1}t\,dt \\ &= \sum_{i=1}^{N} \left[ s_i \frac{\sin\omega_{s1}t}{\omega_{s2}} \right]_{(i-1)T_0}^{iT_0} \\ &= \frac{1}{\omega_{s1}} \sum_{i=1}^{N} s_i \left\{ \sin\left(2\pi\frac{P_1}{q_1}i\right) - \sin\left(2\pi\frac{P_1}{q_1}(i-1)\right) \right\} \\ \int_0^{NT_0} s(t)\sin\omega_{s2}t\,dt &= \sum_{i=1}^{N} \int_{(i-1)T_0}^{iT_0} s_i \sin\omega_{s2}t\,dt \\ &= \sum_{i=1}^{N} \left[ s_i \frac{-\cos\omega_{s2}t}{\omega_{s2}} \right]_{(i-1)T_0}^{iT_0} \\ &= \frac{1}{\omega_{s2}} \sum_{i=1}^{N} s_i \left\{ \cos\left(2\pi\frac{P_2}{q_2}(i-1)\right) - \cos\left(2\pi\frac{P_2}{q_2}i\right) \right\} \\ \int_0^{NT_0} s(t)\cos\omega_{s2}t\,dt &= \sum_{i=1}^{N} \int_{(i-1)T_0}^{iT_0} s_i \cos\omega_{s2}t\,dt \\ &= \sum_{i=1}^{N} \left[ s_i \frac{\sin\omega_{s2}t}{\omega_{s2}} \right]_{(i-1)T_0}^{iT_0} \\ &= \frac{1}{\omega_{s2}} \sum_{i=1}^{N} s_i \left\{ \sin\left(2\pi\frac{P_2}{q_2}i\right) - \sin\left(2\pi\frac{P_2}{q_2}(i-1)\right) \right\} \\ &\vdots \\ \int_0^{NT_0} s(t)\sin\omega_{sk}t\,dt &= \sum_{i=1}^{N} \int_{(i-1)T_0}^{iT_0} s_i \sin\omega_{sk}t\,dt \\ &= \sum_{i=1}^{N} \left[ s_i \frac{-\cos\omega_{sk}t}{\omega_{sk}} \right]_{(i-1)T_0}^{iT_0} \\ &= \frac{1}{\omega_{sk}} \sum_{i=1}^{N} s_i \left\{ \cos\left(2\pi\frac{P_k}{q_k}(i-1)\right) - \cos\left(2\pi\frac{P_k}{q_k}i\right) \right\} \\ \int_0^{NT_0} s(t)\cos\omega_{sk}t\,dt &= \sum_{i=1}^{N} \int_{(i-1)T_0}^{iT_0} s_i \cos\omega_{sk}t\,dt \\ &= \sum_{i=1}^{N} \left[ s_i \frac{\sin\omega_{sk}t}{\omega_{sk}} \right]_{(i-1)T_0}^{iT_0} \\ &= \frac{1}{\omega_{sk}} \sum_{i=1}^{N} s_i \left\{ \sin\left(2\pi\frac{P_k}{q_k}i\right) - \sin\left(2\pi\frac{P_k}{q_k}(i-1)\right) \right\} \end{aligned} \quad (4)$$

Substituting Expression (1) for Expression (4) nullifies the entire Expression (4). Therefore, it is appreciated that the spectrum of a signal formed of a group of symbol patterns selected to satisfy Expression (1) does not include a component at that particular frequency given by Expression (2).

If the total number S of symbols which satisfy Expression (1) satisfies Expression (5), in particular, information of at least N/2 bits may be expressed by a single symbol group (N slots), and therefore slot width T0 may be set to a width just half a bit or larger.

$$S \geq 2^{\frac{N}{2}} \qquad (5)$$

If the total number S of symbols which satisfy Expression (1) satisfies the following Expression (6), information of at least $p_k N/2q_k$ bits may be expressed by a single symbol group (N slots).

$$S \geq 2^{\frac{P_k N}{2q_k}} \qquad (6)$$

Therefore, the bit rate may be set at the level defined by Expression (7) or higher.

$$\frac{p_k N}{2q_k}\left(\frac{1}{NT_0}\right) = \frac{p_k}{2q_k}\left(\frac{1}{T_0}\right) \qquad (7)$$

The particular frequency given by Expression (2) at which the spectrum attains a zero level may be set to a value at most twice that of the bit rate frequency. More specifically, a zero level for the signal spectrum may be set at an arbitrary particular frequency equal to or lower than twice the bit rate frequency.

Furthermore, if the total number S of symbols which satisfy Expression (1) satisfies the following Expression (8), information of at least $p_k N/q_k$ bits may be expressed by a single symbol group (N slots).

$$S \geq 2^{\frac{P_k N}{q_k}} \qquad (8)$$

Therefore, the bit rate may be set at least at a level defined by the following Expression (9).

$$\frac{p_k N}{q_k}\left(\frac{1}{NT_0}\right) = \frac{p_k}{q_k}\left(\frac{1}{T_0}\right) \qquad (9)$$

The particular frequency given by Expression (2) at which the spectrum attains a zero level may be set at a value equal to or lower than the bit rate frequency. More specifically, a zero level may be provided in a signal spectrum at an arbitrary particular frequency equal to or lower than the bit rate frequency.

Embodiments of the present invention will be now described more specifically in conjunction with the accompanying drawings.

First Embodiment

Figure 14:
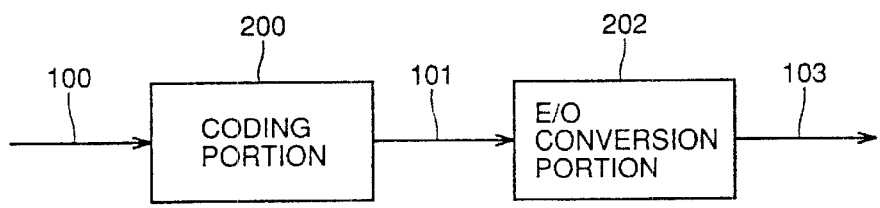
FIG. 14 is a block diagram showing the general configuration of a baseband optical transmitter according to the present invention.

Referring to FIG. 14, a baseband optical transmitter according to this embodiment includes a coding portion 200 and an E/O conversion portion 202.

Coding portion 200 converts 1-bit or multi-bit transmission data 100 into a symbol pattern 101. E/O conversion portion 202 drives a light emitting element based on symbol pattern 101, and converts the pattern into a transmission optical signal pattern 103 for transmission.

Figure 15:
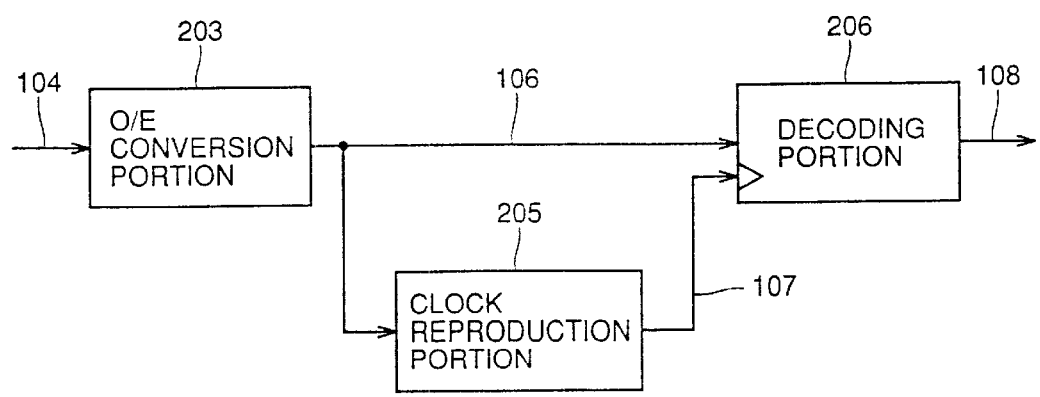
FIG. 15 is a block diagram showing the general configuration of a baseband optical receiver according to the present invention.

Referring to FIG. 15, a baseband optical receiver according to this embodiment includes an O/E conversion portion 203, a clock reproducing portion 205 and a decoding portion 206.

O/E conversion portion 203 converts a received optical signal pattern 104 into an electrical signal by a light receiving element, then removes noise, amplifies the signal and generates a symbol pattern 106, an electrical signal. Clock reproducing portion 205 extracts a clock component included in symbol pattern 106, and reproduces a reproduction clock 107. Decoding portion 206 reproduces received data 108 from symbol pattern 106 and reproduction clock 107.

Note that although in the above description, the transmitter and receiver are separately described, a single transmitter/receiver may be employed.

The process of deriving a symbol when eight slots are used will be now described.

The symbol is derived for the purpose of producing a baseband coding method at 75 Kbps, which is unlikely to interfere with a remote control device using a subcarrier at 36, 38 or 40 kHz and by which the signal spectrum attains a zero level at a single particular frequency.

If k=1 in Expression (1), the following expression results:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \end{array} \right\} \qquad (10)$$

Let us assume that a symbol is formed of eight slots and that information of 4 bits may be expressed by a single symbol group. Then, the same pulse width may be used as the case of employing the 1/2 RZ, 4PPM or Manchester coding method. In this case, 1 bit is represented by two slots on the average, slot time T0=(1/75000)/2=6.67µs. The frequency desired to be suppressed in a signal spectrum is around 6 kHz to 40 kHz, and if $p_1$=1, and $q_1$=4, fsl=37.5 kHz, a value close to 40 kHz is available. At the time Expression (10) is modified into the following expression:

$$\left. \begin{array}{l} s1 - s2 - s3 + s4 + s5 - s6 - s7 + s8 = 0 \\ s1 + s2 - s3 - s4 + s5 + s6 - s7 + s8 = 0 \end{array} \right\} \qquad (11)$$

When symbols which satisfy the expression are calculated, the following 36 symbols result:

{00000000}, {00000101}, {00001010}, {00001111},
{00010100}, {00011110}, {00101000}, {00101101},
{00111100}, {01000001}, {01001011}, {01010000},
{01010101}, {01011010}, {01011111}, {01101001},
{01111000}, {01111101}, {10000010}, {10000111},
{10010110}, {10100000}, {10100101}, {10101010},
{10101111}, {10110100}, {10111110}, {11000011},
{11010010}, {11010111}, {11100001}, {11101011},
{11110000}, {11110101}, {11111010}, {11111111}

If particular 16 symbols are selected from the above and used as a symbol group, information of 4 bits may be expressed by that single symbol group. Symbols of all 0 and all 1 are excluded, because if such patterns serially appear, synchronization is not obtained. The following 16 patterns including less "1s" from the remaining patterns are selected (In infrared communication, electrical power is consumed in proportion to time of light emission, and therefore patterns with less "1s" are selected to reduce power consumption.)

{10100000}, {01010000}, {00101000}, {00010100}, {00001010}, {00000101}, {10000010}, {01000001}, {11110000}, {01111000}, {00111100}, {00111110}, {00001111}, {10000111}, {11000011}, {11100001}

Baseband optical transmitter and receiver in actual infrared communication, using individual selected symbol groups will be now described.

Referring to FIG. 14, transmission data 100 segmented by each 4 bits is transmitted to coding portion 200 on the transmitter side. Coding portion 200 includes conversion table 210 shown in FIG. 16 and a shift register which is not shown.

Conversion table 210 generates a parallel symbol pattern 110 based on the 4 bit (16 kinds of) transmission data. More specifically, the pattern may be simply formed using a ROM (Read Only Memory) or a logic circuit as follows:

P7=(/D2)·(/D1)·(/D0)+(D3)·(D2)·(D0)+(D2)·(D1)·(/D0)
P6=(D3)·(/D2)·(/D1)+(/D2)·(/D1)·(D0)+(D3)·(D2)·(D1)+(D2)·(D1)·(/D0)
P5=(/D2)·(/D0)+(D3)·(/D2)·(/D1)+(D3)·(D2)·(D1)·(D0)
P4=(D3)·(/D2)+(/D2)·(D0)
P3=(D2)·(/D1)·(/D0)+(D3)·(/D2)·(D0)+(/D2)·(D1)·(/D0)
P2=(D3)·(D2)·(/D1)+(D2)·(/D1)·(D0)+(/D2)·(D1)·(D0)+(D3)·(/D2)·(D1)
P1=(D2)·(/D0)+(D3)·(D2)·(/D1)+(D3)·(/D2)·(D1)·(D0)
P0=(D3)·(D2)+(D2)·(/D1)·(D0)+(D2)·(D1)·(/D0)

wherein D3 to D0: transmission data 100, P7 to P0: parallel symbol pattern 110, and "/"=NOT, "·"=AND, and "±"=OR.

The shift register sequentially converts parallel symbol pattern 110 into a serial symbol pattern 101. E/O conversion portion 202 generates and outputs a transmission optical signal pattern 103 the same as symbol pattern 101.

Referring to FIG. 15, a received optical signal pattern 104 is input to O/E conversion portion 203 on the baseband optical receiver side. O/E conversion portion 203 converts received optical signal pattern 104 into an electrical signal and outputs the signal as a symbol pattern 106. Clock reproducing portion 205 is formed of a PLL (Phase Locked Loop) circuit. Decoding portion 206 reproduces received data 108 from reproduction clock 107 reproduced by clock reproduction portion 205 and symbol pattern 106.

Decoding portion 206 includes a shift register and a conversion table 222 shown in FIG. 17. The shift register stores a serial symbol pattern for 8 slots available by sampling symbol pattern 106 by reproduction clock 107, and then outputs the pattern as a parallel symbol pattern 112.

Conversion table 222 generates received data 108 based on 8-bit parallel symbol pattern 112 as shown in FIG. 17. More specifically, the 4 bit (16 kinds of) received data may be reproduced based on for example a simple logic as follows:

D3=(P7)·(P6)·(P5)·(P4)·(/P3)·(/P2)·(/P1)·(/P0) +(/P7)·(P6)·(P5)·(P4)·(P3)·(/P2)·(/P1)·(/P0) +(/P7)·(/P6)·(P5)·(P4)·(P3)·(P2)·(/P1)·(/P0) +(/P7)·(/P6)·(/P5)·(P4)·(P3)·(P2)·(P1)·(/P0) +(/P7)·(/P6)·(/P5)·(/P4)·(P3)·(P2)·(P1)·(P0) +(P7)·(/P6)·(/P5)·(/P4)·(/P3)·(P2)·(P1)·(P0) +(P7)·(P6)·(/P5)·(/P4)·(/P3)·(/P2)·(P1)·(P0) +(P7)·(P6)·(P5)·(/P4)·(/P3)·(/P2)·(/P1)·(P0)

D2=(/P7)·(/P6)·(/P5)·(/P4)·(P3)·(/P2)·(/P1)·(/P0) +(/P7)·(/P6)·(/P5)·(P4)·(/P3)·(P2)·(/P1)·(/P0) +(/P7)·(/P6)·(P5)·(/P4)·(/P3)·(/P2)·(P2)·(/P1)·(/P0) +(/P7)·(P6)·(/P5)·(/P4)·(/P3)·(/P2)·(/P1)·(P0) +(P7)·(/P6)·(/P5)·(/P4)·(/P3)·(/P2)·(/P1)·(/P0) +(/P7)·(/P6)·(/P5)·(/P4)·(P3)·(P2)·(P1)·(/P0) +(P7)·(/P6)·(/P5)·(/P4)·(/P3)·(P2)·(P1)·(P0) +(P7)·(P6)·(/P5)·(/P4)·(/P3)·(/P2)·(P1)·(P0) +(P7)·(P6)·(P5)·(/P4)·(/P3)·(/P2)·(/P1)·(P0)

D1=(/P7)·(/P6)·(P5)·(/P4)·(P3)·(/P2)·(/P1)·(/P0) +(/P7)·(/P6)·(/P5)·(P4)·(/P3)·(P2)·(/P1)·(/P0) +(P7)·(/P6)·(/P5)·(/P4)·(P3)·(/P2)·(P1)·(/P0) +(/P7)·(/P6)·(P5)·(/P4)·(P3)·(/P2)·(/P1)·(/P0) +(/P7)·(/P6)·(P5)·(P4)·(P3)·(P2)·(/P1)·(/P0) +(/P7)·(/P6)·(/P5)·(P4)·(P3)·(P2)·(P1)·(/P0) +(P7)·(/P6)·(/P5)·(/P4)·(/P3)·(/P2)·(P1)·(P0) +(P7)·(P6)·(/P5)·(/P4)·(/P3)·(/P2)·(/P1)·(P0) +(P7)·(P6)·(P5)·(/P4)·(/P3)·(/P2)·(/P1)·(P0)

D0=(/P7)·(P6)·(/P5)·(P4)·(/P3)·(/P2)·(/P1)·(/P0) +(/P7)·(/P6)·(P5)·(P4)·(P3)·(/P2)·(/P1)·(/P0) +(/P7)·(/P6)·(/P5)·(P4)·(/P3)·(P2)·(/P1)·(/P0) +(/P7)·(/P6)·(P5)·(/P4)·(P3)·(/P2)·(/P1)·(P0) +(/P7)·(/P6)·(/P5)·(/P4)·(P3)·(P2)·(P1)·(/P0) +(/P7)·(/P6)·(/P5)·(/P4)·(P3)·(P2)·(P1)·(P0) +(P7)·(/P6)·(/P5)·(/P4)·(/P3)·(P2)·(P1)·(P0) +(P7)·(P6)·(/P5)·(/P4)·(/P3)·(/P2)·(P1)·(P0) +(P7)·(P6)·(P5)·(/P4)·(/P3)·(/P2)·(/P1)·(P0)

wherein P7 to P0: parallel symbol pattern 112, D3 to D0: received data 108, "/"=NOT, "·"=AND, and "+"=OR.

Figure 18:
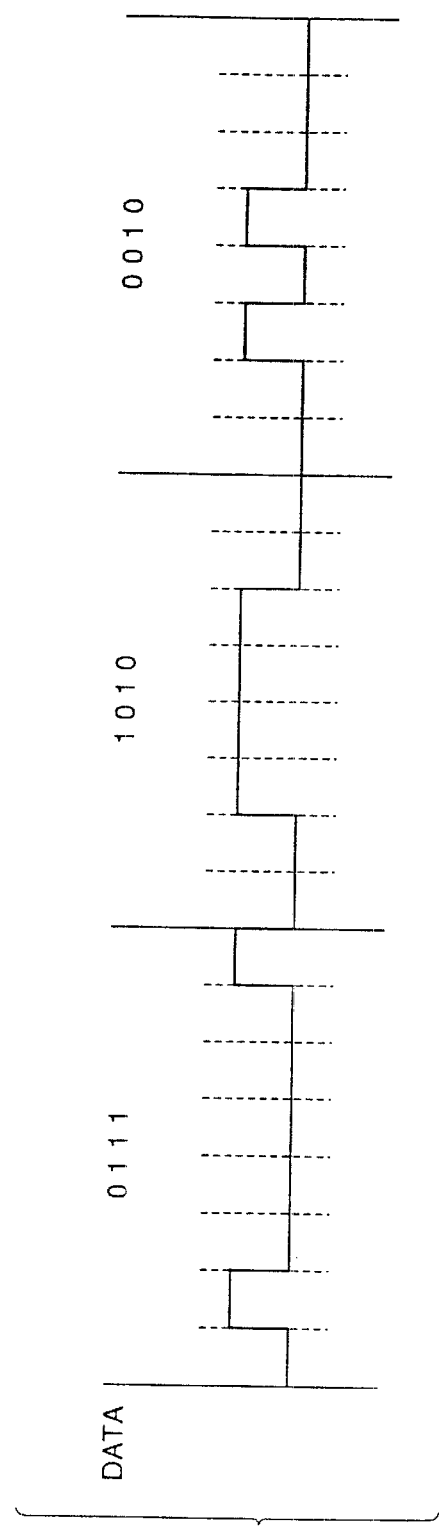
FIG. 18 is a waveform chart of a signal according to baseband coding in the first embodiment.
Figure 19:
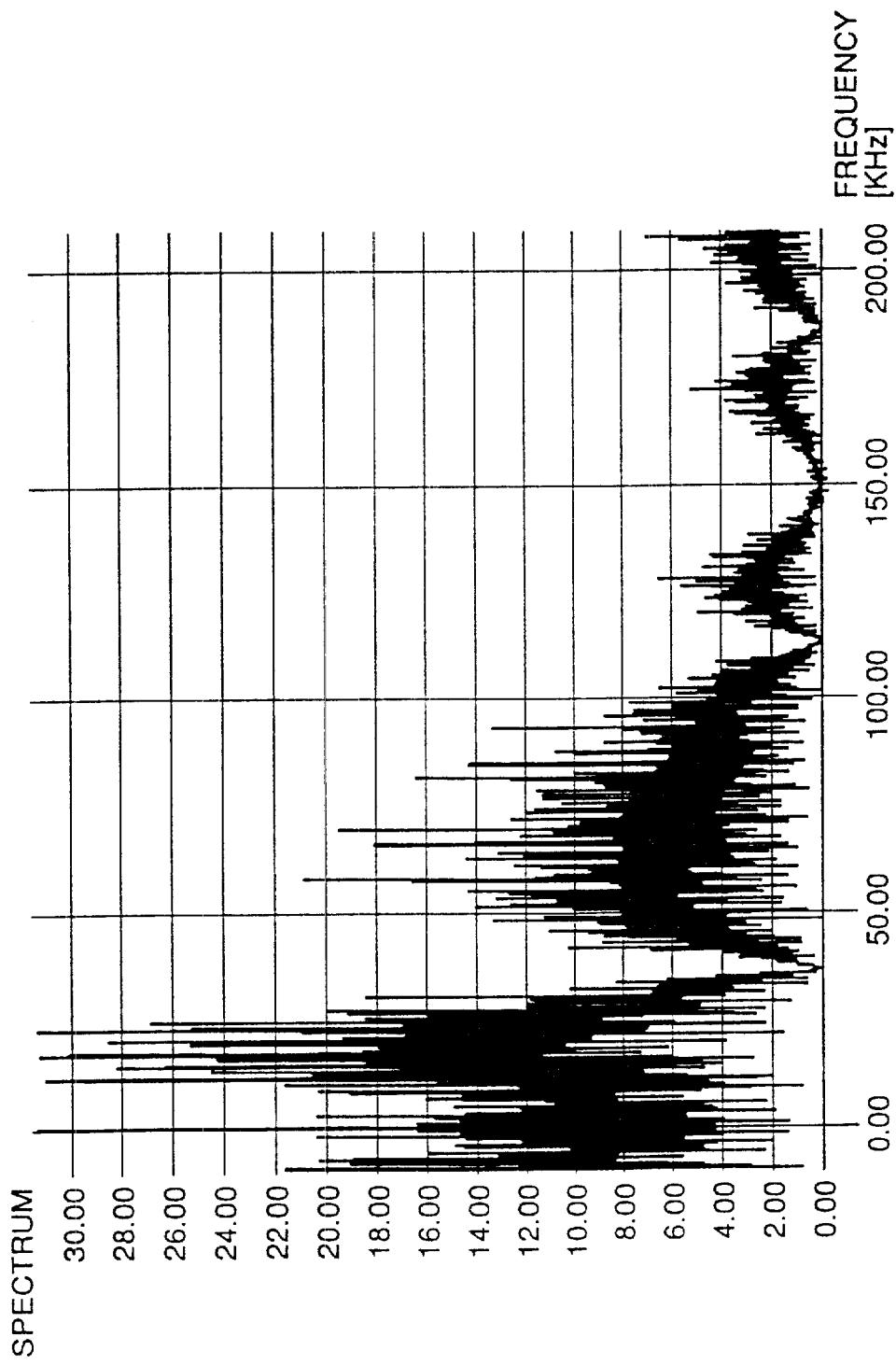
FIG. 19 is a graph showing a signal spectrum according to baseband coding in the first embodiment.

The waveform of a symbol pattern and the form of a signal spectrum during communication by randomly selecting thus selected 16 symbols are shown in FIGS. 18 and 19, respectively.

Second Embodiment

Figure 20:
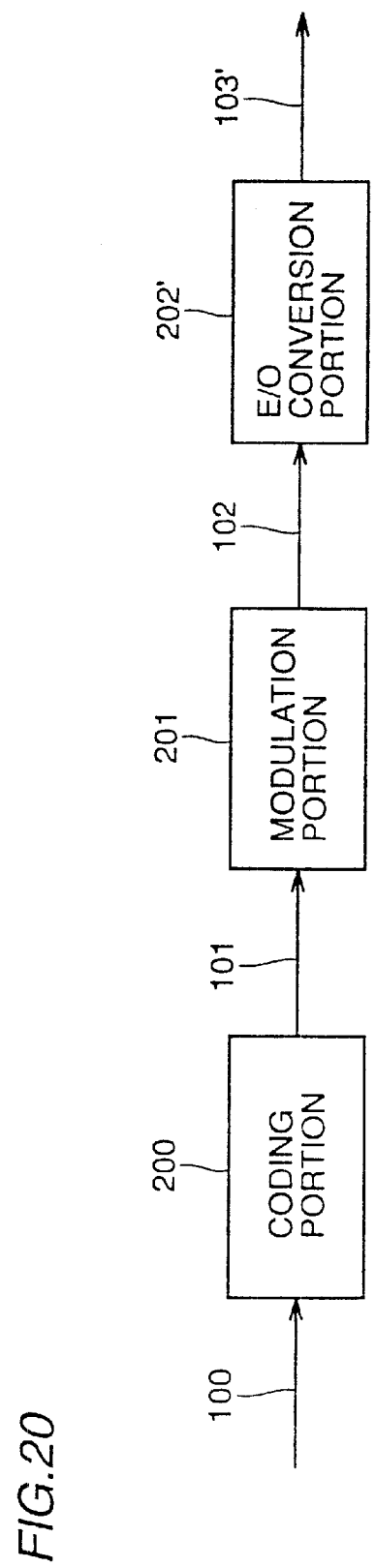
FIG. 20 is a block diagram showing the general configuration of an ASK optical transmitter according to the present invention.

FIG. 20 is a block diagram of an ASK optical transmitter according to this embodiment.

A coding portion 200 converts 1 bit or multi-bit transmission data 100 into a symbol pattern 101. A modulation portion 201 ASK-modulates a subcarrier by symbol pattern 101 and outputs a transmission electrical signal pattern 102. An E/O conversion portion 202' drives a light emitting element according to transmission electrical signal pattern 102, and converts the pattern into a transmission optical signal pattern 103' for transmission.

Figure 21:
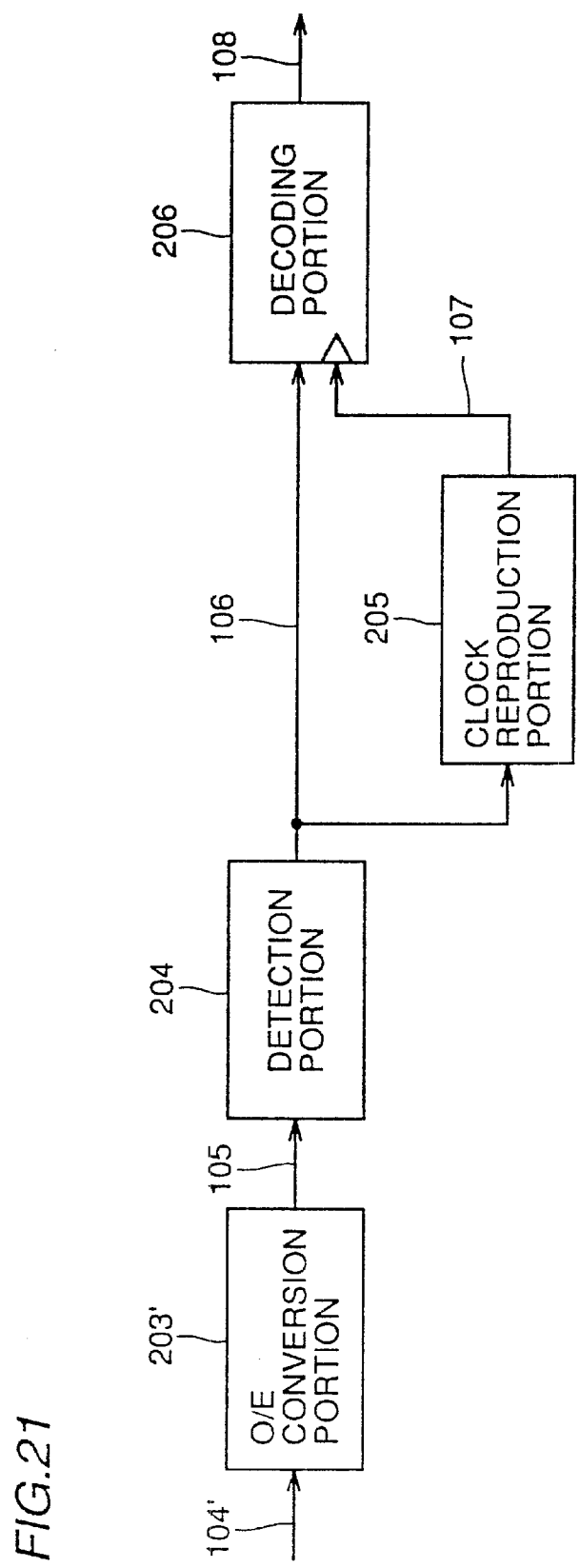
FIG. 21 is a block diagram showing the general configuration of an ASK optical receiver according to the present invention.

FIG. 21 is a block diagram of an ASK optical receiver according to this embodiment.

An O/E conversion portion 203' converts a received optical signal pattern 104' by a light receiving element into an electrical signal, then removes noise, amplifies the signal and generates a received electrical signal pattern 105. Detection portion 204 detects the subcarrier of received electrical signal pattern 105 and reproduces symbol pattern 106. A clock reproduction portion 205 extracts a clock component included in symbol pattern 106, and reproduces a reproduction clock 107. Decoding portion 206 reproduces received data 108 from symbol pattern 106 and reproduction clock 107.

Although the transmitter and receiver are separately illustrated in the above description, a single transmitter/receiver may be employed.

The process of deriving a symbol using eight slots is the same as the process described in the first embodiment, and therefore the detailed description is not repeated here.

The symbol is derived in order to produce an ASK coding method at 75 Kbps, which is unlikely to interfere with a remote control device using a subcarrier at 36, 38 or 40 kHz, and by which the signal spectrum attains a zero level at a single particular frequency.

ASK optical transmitter and receiver in actual infrared communication using individually selected symbol groups will be now described.

Figure 22:
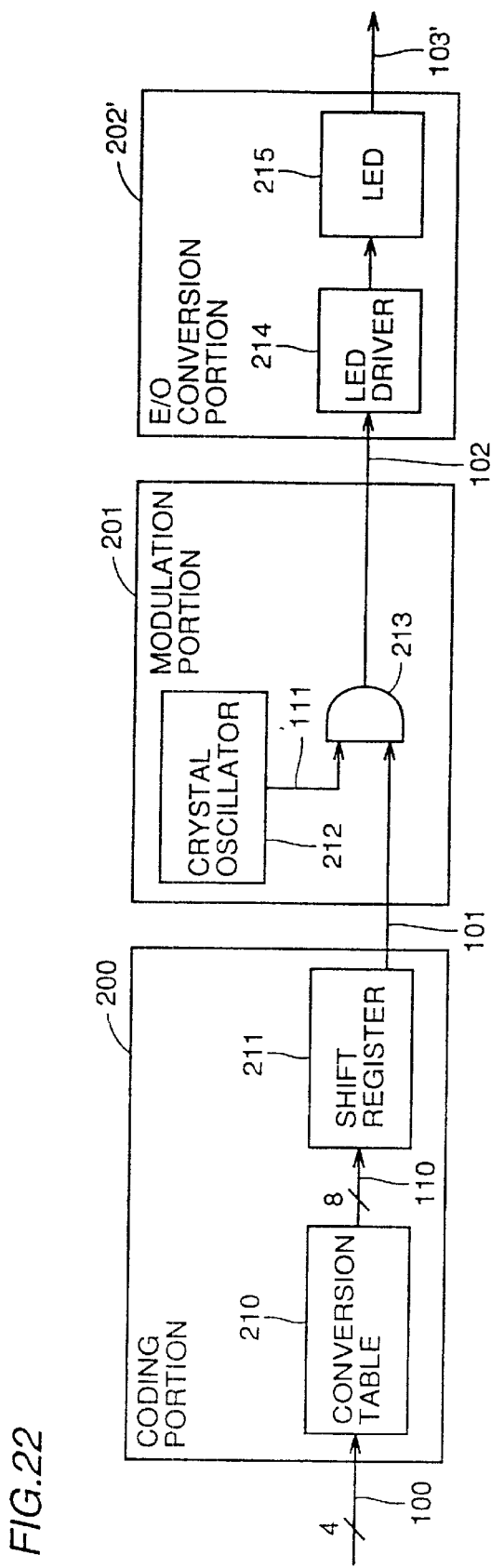
FIG. 22 is a block diagram for use in illustration of details of the ASK optical transmitter according to the present invention.

FIG. 22 is a block diagram showing details of the ASK optical transmitter shown in FIG. 20. Transmission data 100 segmented for each 4 bits is transmitted to coding portion 200 on the ASK optical transmitter side. Coding portion 200 is formed of a conversion table 210 and a shift register 211.

Conversion table 210 is the same as that shown in FIG. 16, and therefore the detailed description is not repeated.

Shift register 211 sequentially converts a parallel symbol pattern 110 into a serial symbol pattern 101. Conversion portion 201 includes a crystal oscillator 212 and an AND gate 213. Since a subcarrier pattern 111 is output from crystal oscillator 212, a transmission optical pattern 102 may be obtained by taking an AND of subcarrier pattern 111 and symbol pattern 101. E/O conversion portion 202' is formed of an LED driver 214 and an LED 215. A transmission optical signal pattern 103' in the same pattern as a transmission electrical pattern 102 is output from E/O conversion portion 202'.

Figure 23:
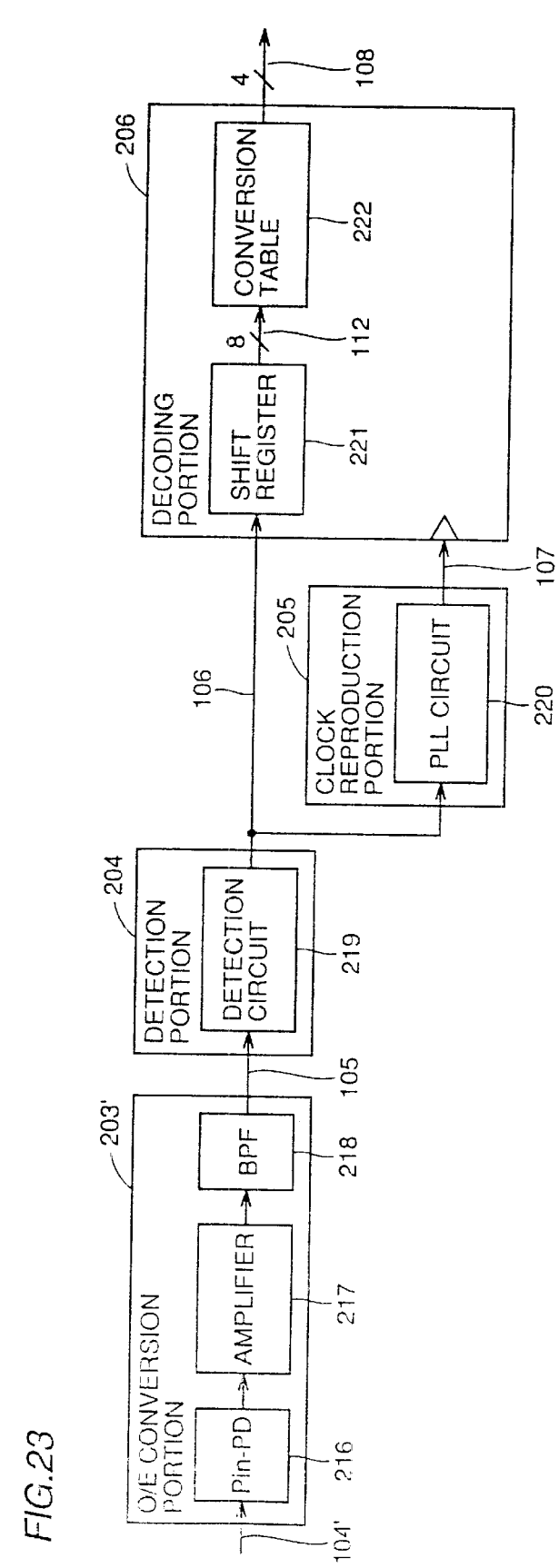
FIG. 23 is a block diagram for use in illustration of details of the ASK optical receiver according to the present invention.

FIG. 23 is a block diagram showing details of the ASK optical receiver shown in FIG. 21.

A received optical signal pattern 104' is input to O/E conversion portion 203' on the ASK optical receiver side. O/E conversion portion 203' includes a PinPD 216, an amplifier 217, and a BPF 218, and outputs a received electrical signal pattern 105. The signal is detected by a detector 204 to obtain a symbol pattern 106. A clock reproduction portion 205 includes a PLL (Phase Locked Loop) circuit 220. Decoding portion 206 reproduces received data 108 from reproduction clock 107 reproduced by clock reproduction portion 205 and symbol pattern 106.

Decoding portion 206 includes a shift register 221 and a conversion table 222. Shift register 221 stores a serial symbol pattern for 8 slots available by sampling symbol pattern 106 by clock 107, and then outputs the pattern as a parallel symbol pattern 112.

Conversion table 222 is the same as that shown in FIG. 17, and therefore the detailed description is not repeated.

Figure 24:
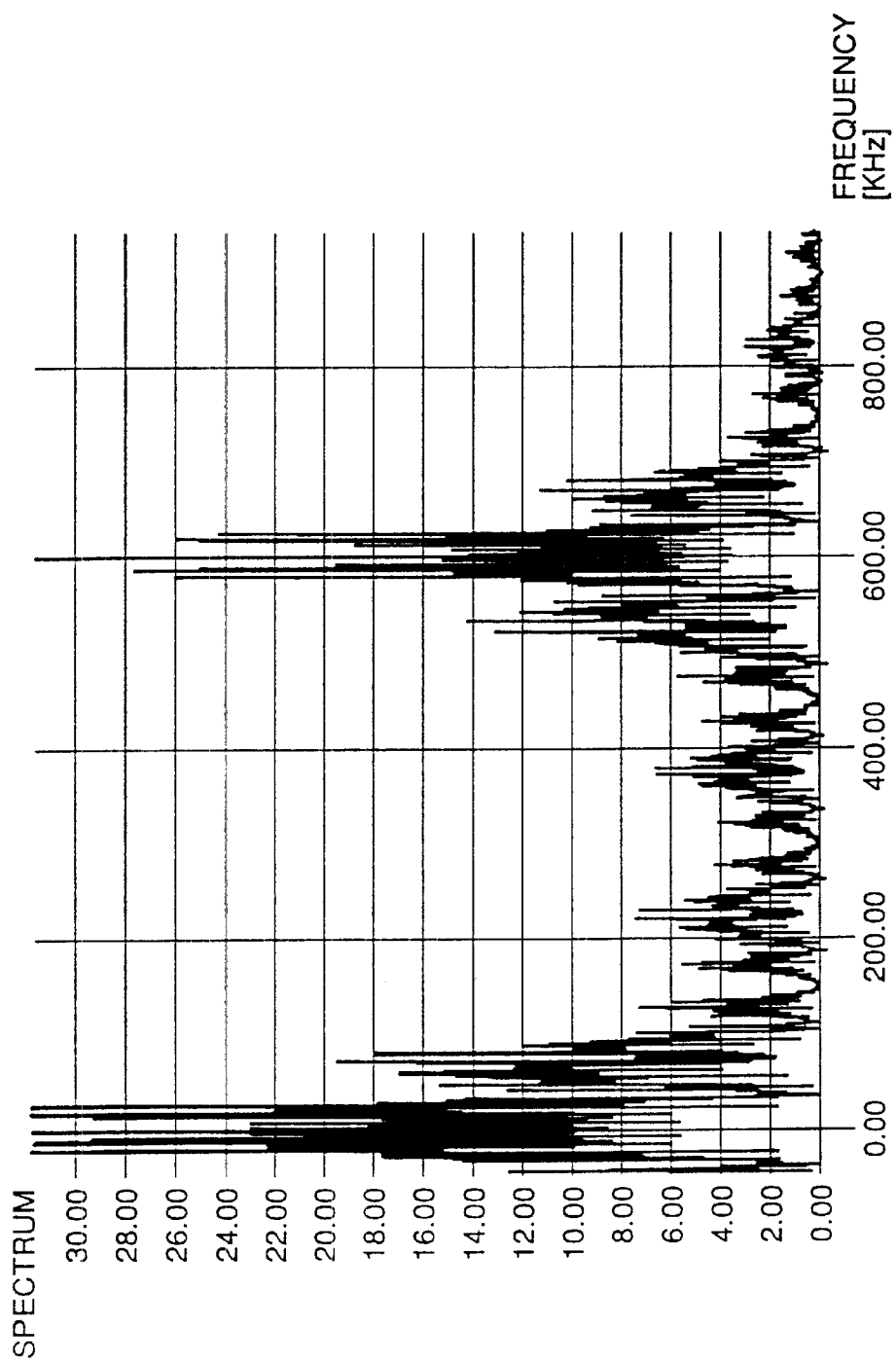
FIG. 24 is a graph showing a signal spectrum according to ASK coding in a second embodiment of the present invention.

The waveform of a symbol pattern in communication by randomly selecting thus selected 16 symbols is the same as that shown in FIG. 18. FIG. 24 shows the spectrum of an ASK coding signal produced by superposing a subcarrier at 600 kHz.

As can be seen in FIG. 24, it is confirmed that a gap may be produced in the spectrum at 37.5 kHz.

Third Embodiment

The process of deriving a symbol when 16 slots are used will be now described.

The symbol is derived for the purpose of producing a baseband coding method or an ASK optical coding method at 75 Kbps, which is unlikely to interfere with a remote control device using a subcarrier at 36, 38, 40 or 56.8 kHz, and by which the signal spectrum attains a zero level at two particular frequencies.

If k=2 in Expression (1), the following expression results:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1} i\right) \right\} = 0 \\ \sum_{i=1}^{N} s_i \left\{ \sin\left(2\pi \frac{P_1}{q_1} i\right) - \sin\left(2\pi \frac{P_1}{q_1}(i-1)\right) \right\} = 0 \\ \sum_{i=1}^{N} s_i \left\{ \cos\left(2\pi \frac{P_2}{q_2}(i-1)\right) - \cos\left(2\pi \frac{P_2}{q_2} i\right) \right\} = 0 \\ \sum_{i=1}^{N} s_i \left\{ \sin\left(2\pi \frac{P_2}{q_2} i\right) - \sin\left(2\pi \frac{P_2}{q_2}(i-1)\right) \right\} = 0 \end{array} \right\} \quad (12)$$

Let us now assume that a symbol is formed of 16 slots, and that information of 8 bits may be represented by a single symbol group. Then, the same pulse width as the case of employing the 1/2 RZ, 4PPM or Manchester coding is employed. In this case, 1 bit is represented by 2 slots on the average, slot time T0=(1/75000)/2=6.67μs. Frequencies desired to be suppressed in the signal spectrum are around 36 kHz to 40 kHz and around 57 kHz, and if $p_1=1$, $q_1=4$, $p_2=3$, and $q_2=8$ in Expression (2), approximate values to 40 kHz and 57 kHz, i.e., fs1=37.5 kHz and fs2=56.25 kHz result. At the time, Expression (12) will be modified into the following Expression:

$$\left. \begin{array}{l} s1 - s2 - s3 + s4 + s5 - s6 - s7 + s8 + s9 - s10 - s11 + s12 + s13 - s14 - s15 + s16 = 0 \\ s1 + s2 - s3 - s4 + s5 + s6 - s7 - s8 + s9 + s10 - s11 - s12 + s13 + s14 - s15 - s16 = 0 \\ (s1 + s4 - s5 - s8 + s9 + s12 - s13 - s16) + \\ (s1 - s2 - s3 + s4 - s5 + s6 + s7 - s8 + s9 - s10 - s11 + s12 - s13 + s14 + s15 - s16) \times \frac{1}{\sqrt{2}} = 0 \\ (s2 - s3 - s6 + s7 + s10 - s11 - s14 + s15) + \\ (-s1 + s2 - s3 + s4 + s5 - s6 + s7 - s8 - s9 + s10 - s11 + s12 + s13 - s14 + s15 - s16) \times \frac{1}{\sqrt{2}} = 0 \end{array} \right\} \quad (13)$$

Expression (13) may be simplified into the following expressions, taking into consideration that the variables may take a value of 0 or 1:

$$s1+s9=s3+s11=s5+s13=s7+s15 \ldots \quad (14)$$

$$s2+s10=s4+s12=s6+s14=s8+s16 \ldots \quad (15)$$

From Expression (14), 18 kinds of solutions defined by Expressions (16) to (18) are available for odd terms.

$$s1=s3=s5=s7=s9=s11=s13=s15=0 \ldots \quad (16)$$

$$s1=s3=s5=s7=s9=s11=s13=s15=1 \ldots \quad (17)$$

$$\left.\begin{array}{l}s9=/s1\\s11=/s3\\s13=/s5\\s15=/s7\end{array}\right\} \quad (18)$$

wherein "/" represents bit inversion.

Similarly, from Expression (15), 18 kinds of solutions defined by Expressions (19) to (21) are available for even terms.

$$s2=s4=s6=s8=s10=s12=s14=s16=0 \ldots \quad (19)$$

$$s2=s4=s6=s8=s10=s12=s14=s16=1 \ldots \quad (20)$$

$$\left.\begin{array}{l}s10=/s2\\s13=/s4\\s15=/s6\\s17=/s8\end{array}\right\} \quad (21)$$

As a result, it is noted that there are 18*18=324 symbols formed of 16 slots [S1, S2, ..., S16], each signal spectrum of which attains a zero level at 37.5 kHz and 56.25 kHz in communication at 75 Kbps.

Two hundred fifty-six symbols should be selected from these 324 symbols, in order to express information of 8 bits by a single symbol group. Only the symbols that satisfy Expressions (18) and (21) are selected. More specifically, all the symbols satisfying the following expression are used:

$$[s1, s2, \ldots, s8, s9, s10, \ldots, s16] = [s1, s2, \ldots, s8, /s1, /s2, \ldots, /s8] \ldots \quad (22)$$

As can be seen from Expression (22), the first half of the symbol [s1, s2, ..., s8] may express the 8 bit data, and the last half of the symbol is a pattern produced by inverting the bits in the first half.

ASK optical transmitter and receiver in actual infrared communication, using thus selected symbol group will be now described. Note that the symbol group may be applied to baseband optical transmitter and receiver, simply by changing the contents of the conversion tables in FIGS. 16 and 17, and by changing the number of bits of the shift register.

Similarly to the second embodiment as shown in FIG. 20, FIG. 22 is used as a block diagram of the ASK transmitter.

Transmission data 100 segmented for each 8 bits is transmitted to coding portion 200 on the ASK transmitter side. Coding portion 200 includes a conversion table 210 and a shift register 211. Conversion table 210 generates a parallel symbol pattern 110 based on 8 bit (256 kinds of) transmission data. More specifically, the pattern may be simply formed using a logic circuit as follows.

P15=D7
P14=D6
P13=D5
P12=D4
P11=D3
P10=D2
P9=D1
P8=D0
P7=/D7
P6=/D6
P5=/D5
P4=/D4
P3=/D3
P2=/D2
P1=/D1
P0=/D0 wherein D7 to D0 are transmission data 100, P15 to P0 are parallel symbol pattern 110, and "/"=NOT.

Shift register 211 sequentially converts parallel symbol pattern 110 into a serial symbol pattern 101. Modulation portion 201 includes a crystal oscillator 212 and an AND gate 213. Since a subcarrier pattern 111 is output from crystal oscillator 212, a transmission optical signal pattern 102 may be obtained by taking an AND of the subcarrier pattern and symbol pattern 101. An E/O conversion portion 202' includes an LED driver 214 and an LED 215. A transmission optical signal patter 103' in the same pattern as a transmission electrical pattern 102 is output from E/O conversion portion 202'.

As is the case with the second embodiment shown in FIG. 21, FIG. 23 is used as a block diagram of the ASK optical receiver.

A received optical signal pattern 104' is input to an O/E conversion portion 203' on the ASK optical receiver side. O/E conversion portion 203' includes a PiNPD 216, an amplifier 217 and a BPF 218, and outputs a received electrical signal pattern 105. A detector 204 detects the signal to produce a symbol pattern 106. A clock reproduction portion 205 is formed of a PLL (Phase Locked Loop) circuit 220. A decoding portion 206 reproduces received data 108 from a reproduction clock 107 reproduced by clock reproduction portion 205 and symbol pattern 106. Decoding portion 206 includes a shift register 221 and a conversion table 222. Shift register 221 stores a serial symbol pattern for 16 slots available by sampling symbol pattern 106 by reproduction clock 107, and then outputs a parallel symbol pattern 112. The conversion table generates 8-bit received data 108 based on parallel symbol pattern 112. More specifically, 8 bit (256 kinds of) received data may be reproduced based on simple logics for example as follows:

D7=P15
D6=P14
D5=P13
D4=P12
D3=P11
D2=P10
D1=P9
D0=P8 wherein P15 to P8 are parallel symbol pattern 112, D7 to D0 are received data 108.

If the following signal is produced, using parallel symbol pattern 112, errors may be detected (data error is caused if ERR indicates logic "1".):

ERR=/((P15$P7)·(P14$P6)·(P13$P5)·(P12$P4)·(P11$P3) ·(P10$P2)·(P9$P1)·(P8$P0))

wherein P15 to P0: parallel symbol pattern 110, "/"=NOT, "."=AND, "$"=exclusive OR.

Figure 25:
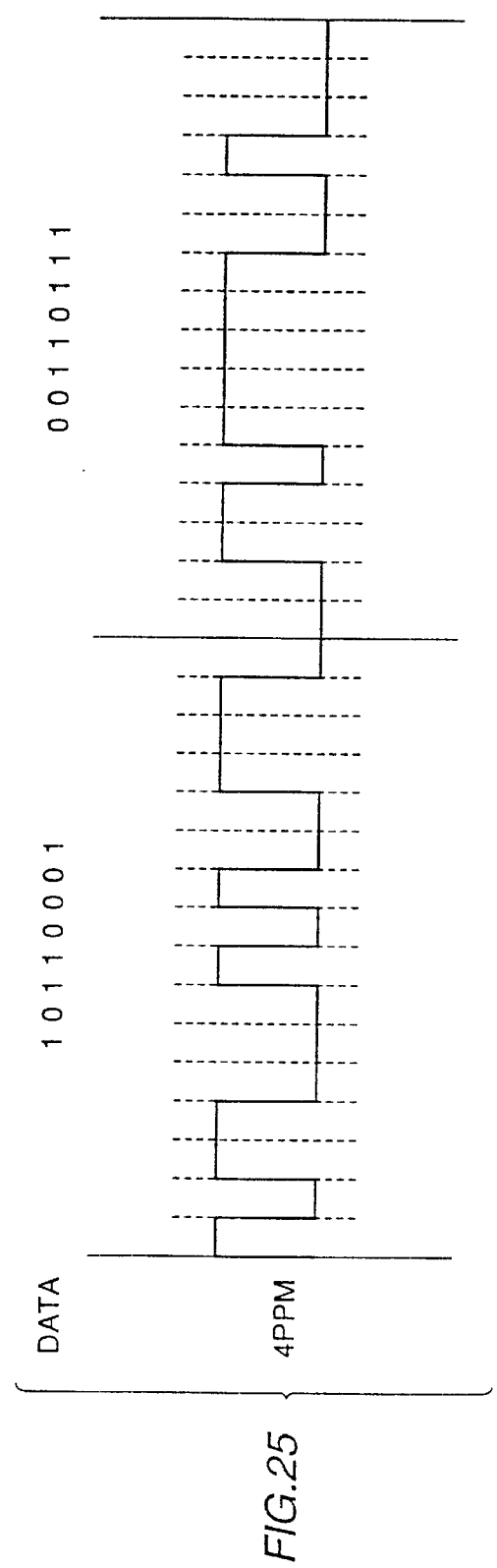
FIG. 25 is a chart of a signal according to baseband coding in a third embodiment of the invention.
Figure 26:
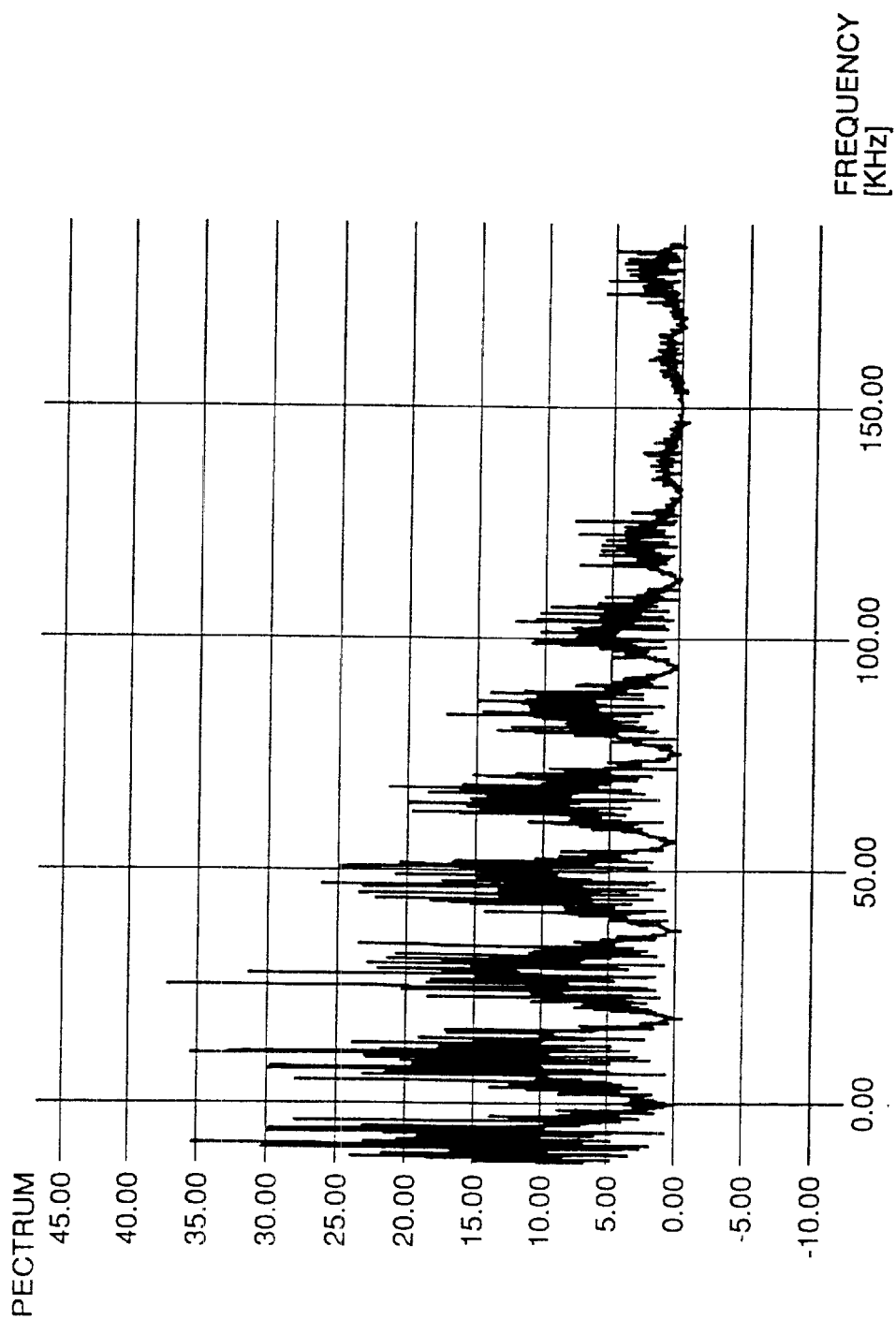
FIG. 26 is a graph showing a signal spectrum according to baseband coding in the third embodiment.

A signal waveform and the shape of a signal spectrum in communication by randomly selecting 256 symbol are shown in FIGS. 25 and 26, respectively. As shown in FIG. 26, it is confirmed that the bit rate of 75 Kbps is implemented, while a gap may be produced in the spectrum at 37.5 kHz and 56.25 kHz.

Fourth to sixty-first embodiments will be now described, each embodiment may be implemented by changing the contents of conversion tables and the number of bits of the shift register in the baseband optical transmitter and receiver shown in FIGS. 14 and 15, or the ASK optical transmitter and receiver as shown in FIGS. 20 and 21.

Fourth Embodiment

Now, when a symbol formed of four slots is considered, and the symbols which satisfy Expression (10) are calculated, where $p_1=1$ and $q_1=2$, the following six symbols are obtained:

{0000}, {0011}, {0110}, {1001}, {1100}, {1111}

As a result, information of at least 2 bits may be expressed by a single symbol group.

Fifth Embodiment

When a symbol of four slots is considered, symbols which satisfy Expression (10) are calculated, where $p_1=1$ and $q_1=4$, the following four symbols are obtained:

{0000}, {0101}, {1010}, {1111}

As a result, information of at least 2 bits may be expressed by a single symbol group.

Sixth Embodiment

When a symbol of 5 slots is considered, and symbols which satisfy Expression (10) are calculated, where $p_1=1$ and $q_1=2$, the following ten symbols are obtained:

{00000}, {00011}, {00110}, {01001}, {01100}, {01111}, {10010}, {11000}, {11011}, {11110}

As a result, information of at least 3 bits may be expressed by a single symbol group.

Seventh Embodiment

When a symbol formed of five slots is considered and symbols which satisfy Expression (10) are calculated, wherein $P_1=1$ and $q_1=3$, the following five symbols are obtained:

{00000}, {00111}, {01110}, {10101}, {11100}

As a result, information of at least 2 bits may be expressed by a single symbol group.

Eighth Embodiment

When a symbol formed of 5 slots is considered, and symbols which satisfy Expression (10) are calculated where $p_1=1$ and $q_1=4$, the following six symbols are obtained:

{00000}, {00101}, {01010}, {01111}, {10100}, {11110}

As a result, information of at least 2 bits may be expressed by a single symbol group.

Ninth Embodiment

When a symbol formed of 6 slots is considered, and such symbols which satisfy Expression (10) are calculated, where $p_1=1$ and $q_1=2$, the following 20 symbols are obtained:

{000000}, {000011}, {000110}, {001001}, {001100}, {001111}, {010010}, {011000}, {011011}, {011110}, {100001}, {100100}, {100111}, {101101}, {110000}, {110011}, {110110}, {111001}, {111100}, {111111}

As a result, information of at least 4 bits may be expressed by a single symbol group.

Tenth Embodiment

When a symbol formed of 6 slots is considered, and such symbols which satisfy Expression (10) are calculated, where $p_1=1$ and $q_1=3$, the following 10 symbols are available:

{000000}, {000111}, {001110}, {010101}, {011100}, {100011}, {101010}, {110001}, {111000}, {111111}

As a result, information of at least 3 bits may be expressed by a single symbol group.

Eleventh Embodiment

When a symbol formed of 6 slots is considered, and such symbols which satisfy Expression (10) are calculated, where $p_1=1$ and $q_1=4$, the following 9 symbols are available:

{000000}, {000101}, {001010}, {001111}, {010100}, {011110}, {101000}, {101101}, {111100}

As a result, information of at least 3 bits may be expressed by a single symbol group.

Twelfth Embodiment

When a symbol formed of 6 slots is considered, and such symbols which satisfy Expression (10) are calculated, where $p_1=1$ and $q_1=6$, the following 10 symbols are obtained:

{000000}, {001001}, {010010}, {010101}, {011011}, {100100}, {101010}, {101101}, {110110}, {111111}

As a result, information of at least 3 bits may be expressed by a single symbol group.

Thirteenth Embodiment

When a symbol formed of 8 slots is considered, and such symbols which satisfy Expression (10) are calculated, where $p_1=1$ and $q_1=2$, the following 70 symbols are obtained:

{00000000}, {00000011}, {00000110}, {00001001}, {00001100}, {00001111}, {00010010}, {00011000}, {00011011}, {00011110}, {00100001}, {00100100}, {00100111}, {00101101}, {00110000}, {00110011}, {00110110}, {00111001}, {00111100}, {00111111}, {01000010}, {01001000}, {01001011}, {01001110}, {01011010}, {01100000}, {01100011}, {01100110}, {01101001}, {01101100}, {01101111}, {01110010}, {01111000}, {01111011}, {01111110}, {10000001}, {10000100}, {10000111}, {10001101}, {10010000}, {10010011}, {10010110}, {10011001}, {10011100}, {10011111}, {10100101}, {10110001}, {10110100}, {10110111}, {10111101}, {11000000}, {11000011}, {11000110}, {11001001}, {11001100}, {11001111}, {11010010}, {11011000}, {11011011}, {11101110}, {11100001}, {11100100}, {11100111}, {11101101}, {11110000}, {11110011}, {11110110}, {11111001}, {11111100}, {11111111}

As a result, information of at least 6 bits may be expressed by a single symbol group.

Fourteenth Embodiment

When a symbol formed of 8 slots is considered, and such symbols which satisfy Expression (10) are calculated, where $p_1=1$ and $q_1=3$, the following 28 symbols are obtained:

{00000000}, {00000111}, {00001110}, {00010101}, {00011100}, {00100011}, {00101010}, {00110001}, {00111000}, {00111111}, {01000110}, {01010100}, {01100010}, {01110000}, {01110111}, {01111110}, {10000101}, {10001100}, {10100001}, {10101000}, {10101111}, {10111101}, {11000100}, {11100000}, {11100111}, {11101110}, {11110101}, {11111100}

Fifteenth Embodiment

When a symbol formed of 8 slots is considered, and such symbols which satisfy Expression (10) are calculated, where $p_1=1$ and $q_1=5$, the following 9 symbols are obtained:

{00000000}, {00011111}, {00111110}, {01011101}, {01111100}, {10011011}, {10111010}, {11011001}, {11111000}

As a result, information of at least 3 bits may be expressed by a single symbol group.

Sixteenth Embodiment

When a symbol formed of 8 slots is considered, and such symbols which satisfy Expression (10) are calculated, where $p_1=1$ and $q_1=6$, the following 24 symbols are obtained:

{00000000}, {0000100}, {00010010}, {00010101}, {00011011}, {00100100}, {00101010}, {00101101}, {00110110}, {00111111}, {01001000}, {01010100}, {01011010}, {01011101}, {01101100}, {01111110}, {10010000}, {10011001}, {10101000}, {10110100}, {10111010}, {10111010}, {11011000}, {11111100}

As a result, information of at least 4 bits may be expressed by a single symbol group.

Seventeenth Embodiment

When a symbol formed of 8 slots is considered, and such symbols which satisfy Expression (10) are calculated, where $p_1=1$ and $q_1=8$, the following 16 symbols are obtained:

{00000000}{00010001}, {00100010}, {00110011}, {01000100}, {01010101}, {01100110}, {01110111}, {10001000}, {10011001}, {10101010}, {10111011}, {11001100}, {11011101}, {11101110}, {11111111}

As a result, information of at least 4 bits may be expressed by a single symbol group.

Eighteenth Embodiment

When a symbol formed of 10 slots is considered, and such symbols which satisfy Expression (10) are calculated, similarly, 252 symbols are obtained.

As a result, information of at least 7 bits may be expressed by a single symbol group.

Nineteenth Embodiment

When a symbol formed of 10 slots is considered, and such symbols which satisfy Expression (10) are calculated, where $p_1=1$ and $q_1=3$, similarly, 95 symbols are obtained.

As a result, information of at least 6 bits may be expressed by a single symbol group.

Twentieth Embodiment

When a symbol formed of 10 slots is considered, and such symbols which satisfy Expression (10) are calculated, where $p_1=1$ and $q_1=4$, similarly, 100 symbols are obtained.

As a result, information of at least 6 bits may be expressed by a single symbol group.

Twenty-first Embodiment

When a symbol formed of 10 slots is considered, and such symbols which satisfy Expression (10) are calculated, where $p_1=1$ and $q_1=5$, similarly, 34 symbols are obtained.

As a result, information of at least 5 bits may be expressed by a single symbol group.

Twenty-second Embodiment

When a symbol formed of 10 slots is considered, and such symbols which satisfy Expression (10) are calculated, where $p_1=1$ and $q_1=6$, similarly, 78 symbols are obtained.

As a result, information of at least 6 bits may be expressed by a single symbol group.

Twenty-third Embodiment

When a symbol formed of 10 slots is considered, and such symbols which satisfy Expression (10) are calculated, where $p_1=1$ and $q_1=7$, similarly, 9 symbols are obtained.

As a result, information of at least 3 bits may be expressed by a single symbol group.

Twenty-fourth Embodiment

When a symbol formed of 10 slots is considered, and such symbols which satisfy Expression (10) are calculated, where $p_1=1$ and $q_1=8$, similarly, 36 symbols are obtained.

As a result, information of at least 5 bits may be expressed by a single symbol group.

Twenty-fifth Embodiment

When a symbol formed of 10 slots is considered, and such symbols which satisfy Expression (10) are calculated, where $p_1=1$ and $q_1=9$, similarly, 12 symbols are obtained.

As a result, information of at least 3 bits may be expressed by a single symbol group.

Twenty-sixth Embodiment

When a symbol formed of 10 slots is considered, and such symbols which satisfy Expression (10) are calculated, where $p_1=1$ and $q_1=10$, similarly, 34 symbols are obtained.

As a result, information of at least 5 bits may be expressed by a single symbol group.

Twenty-seventh Embodiment

When a symbol formed of 12 slots is considered, and such symbols which satisfy Expression (10) are calculated, where $p_1=1$ and $q_1=2$, similarly, 924 symbols are obtained.

As a result, information of at least 9 bits may be expressed by a single symbol group.

Twenty-eighth Embodiment

When a symbol formed of 12 slots is considered, and such symbols which satisfy Expression (10) are calculated, where $p_1=1$ and $q_1=3$, similarly, 346 symbols are obtained.

As a result, information of at least 8 bits may be expressed by a single symbol group.

Twenty-ninth Embodiment

When a symbol formed of 12 slots is considered, and such symbols which satisfy Expression (10) are calculated, where $p_1=1$ and $q_1=4$, similarly, 40 symbols are obtained.

As a result, information of at least 8 bits may be expressed by a single symbol group.

Thirtieth Embodiment

When a symbol formed of 12 slots is considered, and such symbols which satisfy Expression (10) are calculated, where $p_1=1$ and $q_1=5$, similarly, 82 symbols are obtained.

As a result, information of at least 6 bits may be expressed by a single symbol group.

Thirty-first Embodiment

When a symbol formed of 12 slots is considered, and such symbols which satisfy Expression (10) are calculated, where $p_1=1$ and $q_1=6$, similarly, 346 symbols are obtained.

As a result, information of at least 8 bits may be expressed by a single symbol group.

Thirty-second Embodiment

When a symbol formed of 12 slots is considered, and such symbols which satisfy Expression (10) are calculated, where $p_1=1$ and $q_1=7$, similarly, 33 symbols are obtained.

As a result, information of at least 5 bits may be expressed by a single symbol group.

Thirty-third Embodiment

When a symbol formed of 12 slots is considered, and such symbols which satisfy Expression (10) are calculated, where $p_1=1$ and $q_1=8$, similarly, 81 symbols are obtained.

As a result, information of at least 6 bits may be expressed by a single symbol group.

Thirty-fourth Embodiment

When a symbol formed of 12 slots is considered, and such symbols which satisfy Expression (10) are calculated, where $p_1=1$ and $q_1=9$, similarly, 27 symbols are obtained.

As a result, information of at least 4 bits may be expressed by a single symbol group.

Thirty-fifth Embodiment

When a symbol formed of 12 slots is considered, and such symbols which satisfy Expression (10) are calculated, where $p_1=1$ and $q_1=10$, similarly, 78 symbols are obtained.

As a result, information of at least 6 bits may be expressed by a single symbol group.

Thirty-sixth Embodiment

When a symbol formed of 12 slots is considered, and such symbols which satisfy Expression (10) are calculated, where $p_1=1$ and $q_1=12$, similarly, 100 symbols are obtained.

As a result, information of at least 6 bits may be expressed by a single symbol group.

Thirty-seventh Embodiment

When a symbol formed of 8 slots is considered, and such symbols which satisfy Expression (12) are calculated, where $p_1=1$, $q_1=2$, $p_2=3$ and $q_2=4$, similarly, 18 symbols are obtained.

{00000000}, {00001111}, {00011110}, {00101101}, {00111100}, {01001011}, {01011010}, {01101001}, {01111000}, {10000111}, {10010110}, {10100101}, {10110100}, {11000011}, {11010010}, {11100001}, {11110000}, {11111111}

As a result, information of at least 4 bits may be expressed by a single symbol group.

Thirty-eighth Embodiment

When a symbol formed of 9 slots is considered, and such symbols which satisfy Expression (12) are calculated, where $p_1=1$, $q_1=2$, $p_2=3$ and $q_2=4$, similarly, 28 symbols are obtained.

{000000000}, {000001111}, {0000111110}, {000101101}, {000111100}, {001001011}, {001011010}, {001101001}, {001111000}, {010000111}, {010010110}, {010100101}, {010110100}, {011000011}, {011010010}, {011100001}, {011110000}, {011111111}, {100001110}, {100101100}, {101001010}, {101101000}, {110000110}, {110100100}, {111000010}, {111100000}, {111101111}, {111111110}

As a result, information of at least 4 bits may be expressed by a single symbol group.

Thirty-ninth Embodiment

When a symbol formed of 10 slots is considered, and such symbols which satisfy Expression (12) are calculated, where $p_1=1$, $q_1=2$, $p_1=3$ and $q_2=4$, similarly, 46 symbols are obtained.

{0000000000}, {0000001111}, {0000011110}, {0000101101}, {0000111100}, {0001001011}, {0001011010}, {0001101001}, {0001111000}, {0010000111}, {0010010110}, {0010100101}, {0010110100}, {0011000011}, {0011010010}, {0011100001}, {0011110000}, {0011111111}, {0100001110}, {0100101100}, {0101001010}, {0101101000}, {0110000110}, {0110100100}, {0111000010}, {0111100000}, {0111101111}, {0111111110}, {1000001101}, {1000011100}, {1001001001}, {1001011000}, {1010000101}, {1010010100}, {1011000001}, {1011010000}, {1011011111}, {1011111101}, {1100001100}, {1101001000}, {1110000100}, {1110000000}, {1111001111}, {1111011110}, {1111101101}, {1111111100}

As a result, information of at least 5 bits may be expressed by a single symbol group.

Fortieth Embodiment

When a symbol formed of 10 slots is considered, and such symbols which satisfy Expression (12) are calculated, where $p_1=1$, $q_1=3$, $p_2=3$ and $q_2=6$, similarly, 25 symbols are obtained.

{0000000000}, {0000111111}, {00011111110}, {0010111101}, {0011100111}, {0011111100}, {0100111011}, {0101111010}, {0110001111}, {0110111001}, {0111001110}, {0111100011}, {0111111000}, {1000101111}, {1001110110}, {1010110101}, {1110000111}, {1100001111}, {1110110001}, {1111000110}, {1111110000}, {1110011100}, {1110110001}, {1111000110}, {1111110000}

As a result, information of at least 4 bits may be expressed by a single symbol group.

Forty-first Embodiment

When a symbol formed of 12 slots is considered, and such symbols which satisfy Expression (12) are calculated, where $p_1=1$, $q_1=2$, $p_2=3$ and $q_2=4$, the following 164 symbols are obtained.

{000000000000}, {000000001111}, {000000011110},
{000000101101}, {000000111100}, {000001001011},
{000001011010}, {000001101001}, {000001111000},
{000010000111}, {000010010110}, {000010100101},
{000010110100}, {000011000011}, {000011010010},
{000011100001}, {000011110000}, {000011111111},
{000100001110}, {000100101100}, {000101001010},
{000101101000}, {000110000110}, {000110100100},
{000111000010}, {000111100000}, {000111101111},
{000111111110}, {001000001101}, {001000011100},
{001001001001}, {001001011000}, {001010000101},
{001010010100}, {010110000001}, {001011010000},
{001011011111}, {001011111101}, {001100001100},
{001101001000}, {001110000100}, {001111000000},
{001111001111}, {001111011110}, {001111101101},
{001111111100}, {010000001011}, {010000011010},
{010000101001}, {010000111000}, {010010000011},
{010010010010}, {010010100001}, {010010110000},
{010010111111}, {010011111011}, {010100001010},
{010100101000}, {010110000010}, {010110100000},
{010110101111}, {010110111110}, {010111101011},
{010111111010}, {011000001001}, {011000011000},
{011100001000}, {011010010000}, {011110001111},
{011010111101}, {011111011010}, {011111101001},
{011100001000}, {011110000000}, {011110001111},
{011110011110}, {011110101101}, {011110111100},
{011111001011}, {011111011010}, {011111101001},
{011111111000}, {100000000111}, {100000010110},
{100000100101}, {100000110100}, {100001000011},
{100001010010}, {100001100001}, {100001110000},
{100001111111}, {100011110111}, {100100000110},
{100100100100}, {100101000010}, {100101100000},
{100101101111}, {100101111110}, {100111100111},
{100111110110}, {101000000101}, {101000010100},
{101001000001}, {101001010000}, {101001011111},
{101001111101}, {101011010111}, {101011110101},
{101100000100}, {101101000000}, {101101001111},
{101101011110}, {101101101101}, {101101111100},
{101111000111}, {101111010110}, {101111110101},
{101111000111}, {101111010110}, {101111110101},
{101111110100}, {110000000011}, {110000010010},
{110000100001}, {110000110000}, {110000111111},
{110001111011}, {110010110111}, {110011110011},
{110100000010}, {110100100000}, {110100101111},
{110100111110}, {110101101011}, {110101111010},
{110110100111}, {110110110110}, {110111100011},
{110111110010}, {111000000001}, {111000010000},
{111000011111}, {111000111101}, {111001011011},
{111001111001}, {111010010111}, {111010110101},
{111011010011}, {111011110001}, {111100000000},
{111100001111}, {111100011110}, {111100101101},
{111100111100}, {111101001011}, {111101011010},
{111101101001}, {111101111000}, {111110000111},
{111110010110}, {111110100101}, {111110110100},
{111111000011}, {111111010010}, {111111100001},
{111111110000}, {111111111111}

As a result, information of at least 7 bits may be expressed by a single symbol group.

Forty-second Embodiment

When a symbol formed of 12 slots is considered, and such symbols which satisfy Expression (12) are calculated, where $p_1=1$, $q_1=3$, $p_2=3$ and $q_2=6$, the following 90 symbols are obtained.

{000000000000}, {000000111111}, {000001111110},
{000010111101}, {000011100111}, {000011111100},
{000100111011}, {000101111010}, {000110001111},
{000110111001}, {000111001110}, {000111100011},
{000111111000}, {001000110111}, {001001110110},
{001010110101}, {001011110100}, {001100011110},
{001100110011}, {001101110010}, {001110000111},
{001110011100}, {001110110001}, {001111000110},
{001111110000}, {010000101111}, {010001101110},
{010010101101}, {010011101100}, {010100101011},
{010101101010}, {010110101001}, {010111101000},
{011000100111}, {011000111100}, {011001100110},
{011010100101}, {011011100100}, {011100001110},
{011100100011}, {011101100010}, {011110001100},
{011110100001}, {011110000001}, {011111100000},
{100000011111}, {100001011110}, {100001110011},
{100010011101}, {100011000111}, {100011011100},
{100011110001}, {100100011011}, {100101011010},
{100110011001}, {100111000011}, {100111011000},
{101000010111}, {101001010110}, {101010010101},
{101011010100}, {101100010011}, {101101010010},
{101110010001}, {101111010000}, {110000001111},
{110000011100}, {110001001110}, {110001100011},
{110001111000}, {110010001101}, {110011001100},
{110011100001}, {110011110000}, {110100001011},
{110101001010}, {110110001001}, {110111001000},
{111000000111}, {111000011100}, {111001000110},
{111001110000}, {111010000101}, {111011000100},
{111100000011}, {111100011000}, {111101000010},
{111110000001}, {111111000000}, {111111111111}

As a result, information of at least 6 bits may be expressed by a single symbol group.

Forty-third Embodiment

When a symbol formed of 12 slots is considered, and such symbols which satisfy Expression (12) are calculated, where $p_1=1$, $q_1=4$, $p_2=3$ and $q_2=8$, the following 25 symbols are obtained.

{000000000000}, {000001010101}, {000010101010},
{000011111111}, {000101010100}, {000111111110},
{001010101000}, {001011111101}, {001111111100},
{010001010001}, {010011111011}, {010101010000},
{010111111010}, {011011111001}, {011111111000},
{100010100010}, {100011110111}, {100111110110}
{101010100000}, {101011110101}, {101111110100},
{110011110011}, {110111110010}, {111011110001},
{111111110000}

As a result, information of at least 4 bits may be expressed by a single symbol group.

Forty-fourth Embodiment

When a symbol formed of 12 slots is considered, and such symbols which satisfy Expression (12) are calculated, where $p_1=1$, $q_1=6$, $p_2=3$ and $q_2=12$, the following 34 symbols are obtained.

{000000000000}, {00000010110}, {000001011010},
{000010110100}, {000101101000}, {001001001001},
{001011010000}, {001011111101}, {010000001011},
{010010010010}, {010010111111}, {010101010101},
{010110100000}, {010111111010}, {011010000001},
{011011011011}, {011111101001}, {100000010110},
{100100100100}, {100101111110}, {101000000101},
{101001011111}, {101010101010}, {101101000000},
{101101101101}, {101111110100}, {110100000010},
{110100101111}, {110110110110}, {111010010111},
{111101001011}, {111110100101}, {111111010010},
{111111111111}

As a result, information of at least 5 bits may be expressed by a single symbol group.

Forty-fifth Embodiment

When a symbol formed of 14 slots is considered, and such symbols which satisfy Expression (12) are calculated, where $p_1=1$, $q_1=2$, $p_2=3$ and $q_2=4$, similarly, 485 symbols are obtained.

As a result, information of at least 8 bits may be expressed by a single symbol group.

Forty-sixth Embodiment

When a symbol formed of 14 slots is considered, and such symbols which satisfy Expression (12) are calculated, where $p_1=1$, $q_1=3$, $p_2=3$ and $q_2=6$, similarly, 246 symbols are obtained.

As a result, information of at least 7 bits may be expressed by a single symbol group.

Forty-seventh Embodiment

When a symbol formed of 14 slots is considered, and such symbols which satisfy Expression (12) are calculated, where $p_1=1$, $q_1=4$, $p_2=3$ and $q_2=8$, similarly, 81 symbols are obtained.

As a result, information of at least 6 bits may be expressed by a single symbol group.

Forty-eighth Embodiment

When a symbol formed of 14 slots is considered, and such symbols which satisfy Expression (12) are calculated, where $p_1=1$, $q_1=5$, $p_2=3$ and $q_2=10$, similarly, 25 symbols are obtained.

As a result, information of at least 4 bits may be expressed by a single symbol group.

Forty-ninth Embodiment

When a symbol formed of 14 slots is considered, and such symbols which satisfy Expression (12) are calculated, where $p_1=1$, $q_1=6$, $p_2=3$ and $q_2=12$, similarly, 82 symbols are obtained.

As a result, information of at least 6 bits may be expressed by a single symbol group.

Fifty Embodiment

When a symbol formed of 15 slots is considered, and such symbols which satisfy Expression (12) are calculated, where $p=1$, $q_1=2$, $p_2=3$ and $q_2=4$, similarly, 905 symbols are obtained.

As a result, information of at least 9 bits may be expressed by a single symbol group.

Fifty-first Embodiment

When a symbol formed of 15 slots is considered, and such symbols which satisfy Expression (12) are calculated, where $p_1=1$, $q_1=3$, $p_2=3$ and $q_2=6$, similarly, 424 symbols are obtained.

As a result, information of at least 8 bits may be expressed by a single symbol group.

Fifty-second Embodiment

When a symbol formed of 15 slots is considered, and such symbols which satisfy Expression (12) are calculated, where $p_1=1$, $q_1=4$, $p_2=3$ and $q_2=8$, similarly, 162 symbols are obtained.

As a result, information of at least 7 bits may be expressed by a single symbol group.

Fifty-third Embodiment

When a symbol formed of 15 slots is considered, and such symbols which satisfy Expression (12) are calculated, where $p_1=1$, $q_1=5$, $p_2=3$ and $q_2=10$, similarly, 45 symbols are obtained.

As a result, information of at least 5 bits may be expressed by a single symbol group.

Fifty-fourth Embodiment

When a symbol formed of 15 slots is considered, and such symbols which satisfy Expression (12) are calculated, where $p_1=1$, $q_1=6$, $p_2=3$ and $q_2=12$, similarly, 140 symbols are obtained.

As a result, information of at least 7 bits may be expressed by a single symbol group.

Fifty-fifth Embodiment

When a symbol formed of 16 slots is considered, and such symbols which satisfy Expression (12) are calculated, where $p_1=1$, $q_1=2$, $p_2=3$ and $q_2=4$, similarly, 1810 symbols are obtained.

As a result, information of at least 10 bits may be expressed by a single symbol group.

Fifty-sixth Embodiment

When a symbol formed of 16 slots is considered, and such symbols which satisfy Expression (12) are calculated, where $p_1=1$, $q_1=3$, $p_2=3$ and $q_2=6$, similarly, 712 symbols are obtained.

As a result, information of at least 9 bits may be expressed by a single symbol group.

Fifty-seventh Embodiment

When a symbol formed of 16 slots is considered, and such symbols which satisfy Expression (12) are calculated, where $p_1=1$, $q_1=4$, $p_2=3$ and $q_2=8$, similarly, 324 symbols are obtained.

As a result, information of at least 8 bits may be expressed by a single symbol group.

Fifty-eighth Embodiment

When a symbol formed of 16 slots is considered, and such symbols which satisfy Expression (12) are calculated, where $p_1=1$, $q_1=5$, $p_2=3$ and $q_2=10$, similarly, 81 symbols are obtained.

As a result, information of at least 6 bits may be expressed by a single symbol group.

Fifty-ninth Embodiment

When a symbol formed of 16 slots is considered, and such symbols which satisfy Expression (12) are calculated, where $p_1=1$, $q_1=6$, $p_2=3$ and $q_2=12$, similarly, 273 symbols are obtained.

As a result, information of at least 8 bits may be expressed by a single symbol group.

Sixtieth Embodiment

When a symbol formed of 16 slots is considered, and such symbols which satisfy Expression (12) are calculated, where $p_1=1$, $q_1=8$, $p_2=3$ and $q_2=16$, similarly, 16 symbols are obtained.

As a result, information of at least 4 bits may be expressed by a single symbol group.

Sixty-first Embodiment

When a symbol formed of 16 slots is considered, and such symbols which satisfy Expression (12) are calculated, where $p_1=1$, $q_1=12$, $p_2=3$ and $q_2=24$, similarly, 16 symbols are obtained.

As a result, information of at least 4 bits may be expressed by a single symbol group.

As described above, there is no upper limit to the number of slots theoretically, but the number of slots is preferably from 3 to 16 in practice.

As in the foregoing, according to the present invention, a single or a plurality of zero levels may be provided in a signal spectrum at a particular frequency(s) within the main lobe frequency band of the signal spectrum, and therefore interference between a plurality of different infrared communication systems including an existing system (such as remote control device) may be alleviated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of coding a signal for digital communication using a symbol formed of N slots $(s_1, s_2, s_3, \ldots, s_N)$, wherein $s_i$ is either 0 or 1 where i is an integer and $1 \leq i \leq N$, comprising the steps of:

coding transmission data based on a plurality of symbols which satisfy the following expression, wherein k is an arbitary positive integer, and $p_1, q_1, p_2, q_2, \ldots, p_k$ and $q_k$ are integers which satisfy $1 \leq p_1 < q_1$, $1 \leq p_2 < q_2$, $\ldots$, $1 \leq p_k < q_k$, and $p_1/q_1 < p_2/q_2 < \ldots < p_k/q_k$:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \\ \sum_{i=1}^{N} s_i \left\{ \cos\left(2\pi \frac{P_2}{q_2}(i-1)\right) - \cos\left(2\pi \frac{P_2}{q_2}i\right) \right\} = 0 \\ \sum_{i=1}^{N} s_i \left\{ \sin\left(2\pi \frac{P_2}{q_2}i\right) - \sin\left(2\pi \frac{P_2}{q_2}(i-1)\right) \right\} = 0 \\ \vdots \\ \sum_{i=1}^{N} s_i \left\{ \cos\left(2\pi \frac{P_k}{q_k}(i-1)\right) - \cos\left(2\pi \frac{P_k}{q_k}i\right) \right\} = 0 \\ \sum_{i=1}^{N} s_i \left\{ \sin\left(2\pi \frac{P_k}{q_k}i\right) - \sin\left(2\pi \frac{P_k}{q_k}(i-1)\right) \right\} = 0 \end{array} \right.$$

and transmitting the coded transmission data.

2. The method as recited in claim 1, wherein said step of coding transmission data based on a plurality of symbols codes the transmission data based on a plurality of symbols which satisfy the following expression:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \end{array} \right.$$

3. The method as recited in claim 1, wherein said step of coding transmission data based on a plurality of symbols codes a plurality of symbols which satisfy the following expression:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \\ \sum_{i=1}^{N} s_i \left\{ \cos\left(2\pi \frac{P_2}{q_2}(i-1)\right) - \cos\left(2\pi \frac{P_2}{q_2}i\right) \right\} = 0 \\ \sum_{i=1}^{N} s_i \left\{ \sin\left(2\pi \frac{P_2}{q_2}i\right) - \sin\left(2\pi \frac{P_2}{q_2}(i-1)\right) \right\} = 0 \end{array} \right.$$

4. The method of coding a signal for digital optical communication using a symbol formed of N slots $(s_1, s_2, s_3, \ldots, s_N)$, wherein $s_i$ is either 0 or 1 where i is an integer and $1 \leq i < N$, comprising the steps of:

coding transmission data based on a plurality of symbols which satisfy the following expression, wherein k is an arbitary positive integer, and $p_1, q_1, p_2, q_2, \ldots, p_k$ and $q_k$ are integers which satisfy $1 \leq p_1 < q_1$, $1 \leq p_2 < q_2$, $\ldots$, $1 \leq p_k < q_k$, and $p_1/q_1 < p_2/q_2 < \ldots < p_k/q_k$:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \\ \sum_{i=1}^{N} s_i \left\{ \cos\left(2\pi \frac{P_2}{q_2}(i-1)\right) - \cos\left(2\pi \frac{P_2}{q_2}i\right) \right\} = 0 \\ \sum_{i=1}^{N} s_i \left\{ \sin\left(2\pi \frac{P_2}{q_2}i\right) - \sin\left(2\pi \frac{P_2}{q_2}(i-1)\right) \right\} = 0 \\ \vdots \\ \sum_{i=1}^{N} s_i \left\{ \cos\left(2\pi \frac{P_k}{q_k}(i-1)\right) - \cos\left(2\pi \frac{P_k}{q_k}i\right) \right\} = 0 \\ \sum_{i=1}^{N} s_i \left\{ \sin\left(2\pi \frac{P_k}{q_k}i\right) - \sin\left(2\pi \frac{P_k}{q_k}(i-1)\right) \right\} = 0 \end{array} \right.$$

and converting the coded transmission data into an optical signal.

5. The method as recited in claim 4, wherein said step of coding transmission data based on a plurality of symbols codes the transmission data based on a plurality of symbols which satisfy the following expression:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \end{array} \right\}.$$

6. The method as recited in claim 4, wherein
said step of coding transmission data based on a plurality of symbols codes a plurality of symbols which satisfy the following expression:

$$\left. \begin{array}{l} \sum_{i=1}^{N} s_i \left\{ \cos\left(2\pi \frac{P_1}{q_1}(i-1)\right) - \cos\left(2\pi \frac{P_1}{q_1}i\right) \right\} = 0 \\ \sum_{i=1}^{N} s_i \left\{ \sin\left(2\pi \frac{P_1}{q_1}i\right) - \sin\left(2\pi \frac{P_1}{q_1}(i-1)\right) \right\} = 0 \\ \sum_{i=1}^{N} s_i \left\{ \cos\left(2\pi \frac{P_2}{q_2}(i-1)\right) - \cos\left(2\pi \frac{P_2}{q_2}i\right) \right\} = 0 \\ \sum_{i=1}^{N} s_i \left\{ \sin\left(2\pi \frac{P_2}{q_2}i\right) - \sin\left(2\pi \frac{P_2}{q_2}(i-1)\right) \right\} = 0 \end{array} \right\}.$$

7. A method of coding a signal for digital communication using a symbol formed of 8 slots ($s_1$, $s_2$, $s_3$, . . . , $s_8$), comprising the steps of:
coding transmission data based on arbitrary symbols selected exclusively from the following 36 symbols:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}
and transmitting the coded transmission data.

8. A method of coding a signal for digital optical communication using a symbol formed of 8 slots ($s_1$, $s_2$, $s_3$, . . . , $s_8$), comprising the steps of:
coding transmission data based on arbitrary symbols selected exclusively from the following 36 symbols:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}
and converting the coded transmission data into an optical signal.

9. A baseband transmitter using a symbol formed of 8 slots ($s_1$, $s_2$, $s_3$, . . . , $s_8$), comprising:
coding portion coding transmission data based on arbitray symbols selected exclusively from the following 36 symbols and outputting the coded data as a symbol pattern:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}
and transmitting portion transmitting the symbol pattern output by said coding portion.

10. A baseband transmitter using a symbol formed of 8 slots ($s_1$, $s_2$, $s_3$, . . . , $s_8$), comprising:
coding portion coding transmission data based on arbitray symbols selected exclusively from the following 36 symbols and outputting the coded data as a symbol pattern:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}
and electrical to optical conversion portion converting the symbol pattern output by said coding portion into an optical signal.

11. A baseband receiver using a symbol formed of 8 slots ($s_1$, $s_2$, $s_3$, . . . , $s_8$), comprising:
receiving portion receiving a signal pattern; and
decoding portion decoding said sumbol pattern based on arbitray symbols selected exclusively from the following 36 symbols and generating received data:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}.

12. A baseband receiver using a symbol formed of 8 slots ($s_1$, $s_2$, $s_3$, . . . , $s_8$), comprising:
optical to electrical conversion portion converting a received optical signal pattern into a symbol pattern; and
decoding portion decoding said symbol pattern based on arbitrary symbols selected exclusively from the following 36 symbols and generating received data:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}.

13. An amplitude shift keying transmitter using a symbol formed of 8 slots ($s_1$, $s_2$, $s_3$, . . . , $s_8$), comprising:
coding portion coding transmission data based on arbitrary symbols selected exclusively from the following 36 symbols and outputting the coded data as a symbol pattern:
{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111} modulation portion superposing a subcarrier on the symbol pattern output by said coding portion and generating an electrical signal pattern; and transmitting portion transmitting the electrical signal pattern generated by said modulation portion.

14. An amplitude shift keying optical transmitter using a symbol formed of 8 slots ($s_1, s_2, s_3, \ldots, s_8$), comprising coding portion coding transmission data based on arbitrary symbols selected exclusively from the follwoing 36 symbols and outputting the coded data as a symbol pattern:

{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111} modulation portion superposing a subcarrier on the symbol pattern output by said coding portion and generating an electrical signal pattern; and electrical to optical conversion portion converting the electrical signal pattern generated by said modulation portion into an optical signal.

15. An amplitude shift keying receiver using a symbol formed of 8 slots ($s_1, s_2, s_3, \ldots, s_8$), comprising:

receiving portion receiving a signal pattern;

detection portion detecting said signal pattern and generating a symbol pattern; and decoding portion decoding said symbol pattern based on arbitrary symbols selected exclusively from the following 36 symbols and generating received data:

{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}.

16. An optical amplitude shift keying receiver using a symbol formed of 8 slots ($s_1, s_2, s_3, \ldots, s_8$), comprising:

optical to electrical conversion portion converting a received optical signal pattern into an electrical signal pattern;

detection portion detecting said electrical signal pattern and generating a symbol pattern; and decoding portion decoding said symbol pattern based on arbitrary symbols selected exclusively from the following 36 symbols and generating received data:

{00000000}, {00000101}, {00001010}, {00001111}, {00010100}, {00011110}, {00101000}, {00101101}, {00111100}, {01000001}, {01001011}, {01010000}, {01010101}, {01011010}, {01011111}, {01101001}, {01111000}, {01111101}, {10000010}, {10000111}, {10010110}, {10100000}, {10100101}, {10101010}, {10101111}, {10110100}, {10111110}, {11000011}, {11010010}, {11010111}, {11100001}, {11101011}, {11110000}, {11110101}, {11111010}, {11111111}.

* * * * *

UNITED STATES PATENT AND TRADEMARK OFFICE
CERTIFICATE OF CORRECTION

PATENT NO. : 6,456,667 B2
DATED : September 24, 2002
INVENTOR(S) : Yoshihiro Ohtani, Hiroshi Uno and Yutaka Ikeda It is certified that error appears in the above-identified patent and that said Letters Patent is hereby corrected as shown below:

<u>Title page,</u>
Item [30], Related U.S. Application Data, please change "Pat. No. 6,215,862" to -- Pat. No. 6,215,826 --.

Signed and Sealed this

Fourth Day of March, 2003

JAMES E. ROGAN
*Director of the United States Patent and Trademark Office*